US011150663B2

(12) United States Patent
Shirvani et al.

(10) Patent No.: US 11,150,663 B2
(45) Date of Patent: Oct. 19, 2021

(54) DETECTION OF HAZARDOUS DRIVING USING MACHINE LEARNING

(71) Applicant: NVIDIA Corporation, Santa Clara, CA (US)

(72) Inventors: Philip Shirvani, San Mateo, CA (US); Richard Bramley, Santa Clara, CA (US); John Montrym, Los Altos Hills, CA (US); Nirmal Saxena, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 97 days.

(21) Appl. No.: 16/258,272

(22) Filed: Jan. 25, 2019

(65) Prior Publication Data

US 2019/0235515 A1 Aug. 1, 2019

Related U.S. Application Data

(60) Provisional application No. 62/622,538, filed on Jan. 26, 2018.

(51) Int. Cl.

| | |
|---|---|
| ***G05D 1/02*** | (2020.01) |
| ***G06K 9/00*** | (2006.01) |
| ***G06K 9/62*** | (2006.01) |
| ***G06N 20/00*** | (2019.01) |
| ***G05D 1/00*** | (2006.01) |

(Continued)

(52) U.S. Cl.
CPC ......... *G05D 1/0221* (2013.01); *G05D 1/0088* (2013.01); *G05D 1/0214* (2013.01); *G06K 9/00791* (2013.01); *G06K 9/6271* (2013.01); *G06N 3/0454* (2013.01); *G06N 3/08* (2013.01); *G06N 20/00* (2019.01); *G05D 2201/0213* (2013.01)

(58) Field of Classification Search
CPC .. G05D 1/0221; G05D 1/0088; G05D 1/0214; G05D 2201/0213; G06K 9/00791; G06K 9/6271; G06N 20/00; G06N 3/0454; G06N 3/08
USPC .......................................................... 701/27
See application file for complete search history.

(56) References Cited

U.S. PATENT DOCUMENTS

| | | | |
|---|---|---|---|
| 9,460,382 | B2 | 10/2016 | Canoy et al. |
| 2010/0228447 | A1 | 9/2010 | Serban et al. |

(Continued)

FOREIGN PATENT DOCUMENTS

| | | | |
|---|---|---|---|
| WO | 2017/155598 | A2 | 9/2017 |

OTHER PUBLICATIONS

International Preliminary Report on Patentability and Written Opinion for corresponding PCT/US2019/015154, dated Jul. 28, 2020.
International Search Report and Written Opinion of the International Searching Authority dated May 17, 2019, issued in International Application No. PCT/US2019/015154, 19 pages.

(Continued)

*Primary Examiner* — Jonathan M Dager
*Assistant Examiner* — Jean W Charleston
(74) *Attorney, Agent, or Firm* — Nixon & Vanderhye PC

(57) ABSTRACT

An autonomous driving system could create or exacerbate a hazardous driving situation due to incorrect machine learning, algorithm design, sensor limitations, environmental conditions or other factors. This technology presents solutions that use machine learning to detect when the autonomous driving system is in this state e.g., erratic or reckless driving and other behavior, in order to take remedial action to prevent a hazard such as a collision.

20 Claims, 13 Drawing Sheets

(51) Int. Cl.
*G06N 3/04* (2006.01)
*G06N 3/08* (2006.01)

(56) References Cited

U.S. PATENT DOCUMENTS

| | | | | |
|---|---|---|---|---|
| 2016/0196754 | A1* | 7/2016 | Surace | G08G 5/0013 701/117 |
| 2018/0005106 | A1* | 1/2018 | Hachiya | G06N 3/082 |
| 2018/0025636 | A1* | 1/2018 | Boykin | G06K 9/00335 701/1 |
| 2018/0109776 | A1* | 4/2018 | Lee | G06N 20/00 |
| 2018/0196599 | A1* | 7/2018 | Kim | G06N 3/0445 |
| 2019/0146497 | A1* | 5/2019 | Urtasun | G06K 9/00805 701/27 |
| 2019/0235515 | A1* | 8/2019 | Shirvani | G06K 9/6271 |

OTHER PUBLICATIONS

Aljundi, Rahaf, et al., "Expert Gate: Lifelong Learning with a Network of Experts," Computer Vision Foundation Open Access Version, Jul. 2017, pp. 3366-3375, XP55586250A.

Bojarski, Mariusz, et al., "End to End Learning for Self-Driving Cars," arXiv:1604.07316v1 [cs.CV] Apr. 25, 2016, 9 pages.

Bojarski, Mariusz, et al., "Explaining How a Deep Neural Network Trained with End-to-End Learning Steers a Car," arXiv:1704.07911v1 [cs.CV] Apr. 25, 2017, 8 pages.

Zha, "Remote Monitoring and Fault Prognostics: Watchdog Agent," Artificial Intelligence and Integrated Intelligent Information Systems: Emerging Technologies and Applications (IGI Global Oct. 5, 2006), p. 322.

"Watchdog Agent Prognostics Toolkit," National Instruments, Last Revised: Nov. 6, 2014 07:15:11.0, 3 pages.

* cited by examiner

Training

DETECTION OF HAZARDOUS DRIVING USING MACHINE LEARNING

CROSS-REFERENCE TO RELATED APPLICATIONS

Priority is claimed from U.S. Provisional Application No. 62/622,538 filed Jan. 26, 2018, incorporated herein by reference for all purposes.

STATEMENT REGARDING FEDERALLY SPONSORED RESEARCH OR DEVELOPMENT

This invention was made with US Government support under LLNS subcontract B609487 awarded by DOE. The US Government has certain rights in this invention.

FIELD

This technology relates to machine learning, and more particularly to methods and apparatus for using machine learning to detect and correct for dangerous and other control operations including but not limited to hazardous autonomous driving.

BACKGROUND

In complex processing systems such as those required for autonomous driving, redundancy is mandatory to provide good systematic and random fault coverage.

Other systems have used plausibility checks (i.e., steering too large or on collision course) for detection of poor primary control.

SUMMARY

We propose the use of machine learning such as deep neural networks (DNNs) for a redundant and/or checking path e.g., for a rationality checker as part of functional safety for autonomous driving.

In some embodiments, a system comprises sensors that provide sensor outputs for detecting objects; at least one processor operatively coupled to receive the sensor outputs, the at least one processor using the received sensor outputs to generate action planning, the at least one processor operating from a first perspective to generate action planning in response to the sensor outputs; and the at least one processor executing, based on instructions stored in memory, a machine learning object that uses said sensor outputs and a second perspective different from the first perspective to check the generated action planning and generates outputs that enable selective overriding and/or modifying of the generated action planning.

In some embodiments, the at least one processor executes instructions stored in memory to control the machine learning object to check whether the generated action planning will cause unsafe conditions if implemented.

In some embodiments, the at least one processor executes instructions stored in memory to control the machine learning object to check whether the generated action planning will cause an illegal operation if implemented.

In some embodiments, the at least one processor executes instructions stored in memory to control the machine learning object to check whether the generated action planning will cause an unethical operation if implemented.

In some embodiments, the at least one processor generates plural potential plans of action, and executes instructions stored in memory to control the machine learning object to rate the plural potential plans of action.

In some embodiments, the at least one processor executes instructions stored in memory to control the machine learning object to rate the action planning the at least one processor generates based on safety.

In some embodiments, the at least one processor executes one or more machine learning objects to generate the action planning.

In some embodiments, the machine learning objects are trained using the same data. In other embodiments, the machine learning objects are trained using different data.

Some embodiments further comprise an arbiter that decides whether to override the generated action planning in response to the generated outputs.

In some embodiments, the at least one processor executes instructions stored in memory to control the machine learning object to provide at least some of the generated outputs to generate the action planning.

In some embodiments, the sensor outputs comprise at least two of object location/position tracking, environment sensing, obstacle location mapping, or driving mode.

In some embodiments, the at least one processor executes instructions in memory to control the machine learning object to generate a hazard level scalar value indicating a hazard level of the generated action planning.

Some embodiments further include a hand-coded safety system that also monitors the action planning.

In some embodiments, the at least one processor executes instructions stored in memory to configure the machine learning object to be simpler and/or lower resolution than a process executed by the at least one processor to generate the action planning from the first perspective.

In some embodiments, the first perspective is how to drive safely and the second perspective is how not to drive safely.

Some embodiments provide a method performed by a least one processor by executing instructions stored in memory, the method comprising: executing first instructions stored in memory to process sensor inputs with machine learning to generate operational outputs; executing second instructions stored in memory to process the same or different sensor inputs with machine learning that is complementary to the machine learning used to generate the operational outputs; and selectively implementing the generated operational outputs at least in part in response to the processing with the complementary machine learning.

Some embodiments further include training the machine learning to generate operational outputs and the complementary machine learning with the same training data. Other embodiments further include training the machine learning to generate operational outputs and the complementary machine learning with different training data.

In some embodiments, selectively implementing includes arbitrating use of the generated operational outputs at least in part in response to results of the processing with the complementary machine learning.

Some embodiments provide a system comprising: at least one processor that generates operation commands in response to inputs; and at least one machine learning object that provides: 1) a same perspective as the operation command generation but at lower accuracy or precision, and/or 2) a different perspective as the operation command generation including an inverse perspective; and/or 3) plausibility checking, and/or 4) different aspects of a problem solved separately and/or redundantly.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

Example embodiments provide machine learning systems and techniques such as one or more neural networks working in a diverse redundancy configuration to detect various kinds of faults including unsafe control operations. One advantageous non-limiting embodiment uses a plurality of non-identical machine learning mechanisms exhibiting non-overlapping behaviors (e.g., different neural networks having the same or different resolutions) to detect and prevent irrational and/or unsafe outcomes. Such non-overlapping behaviors can make the overall system more resistant to random hardware faults, systematic hardware faults and/or systematic software faults.

Example Autonomous Driving System

Figure 1:
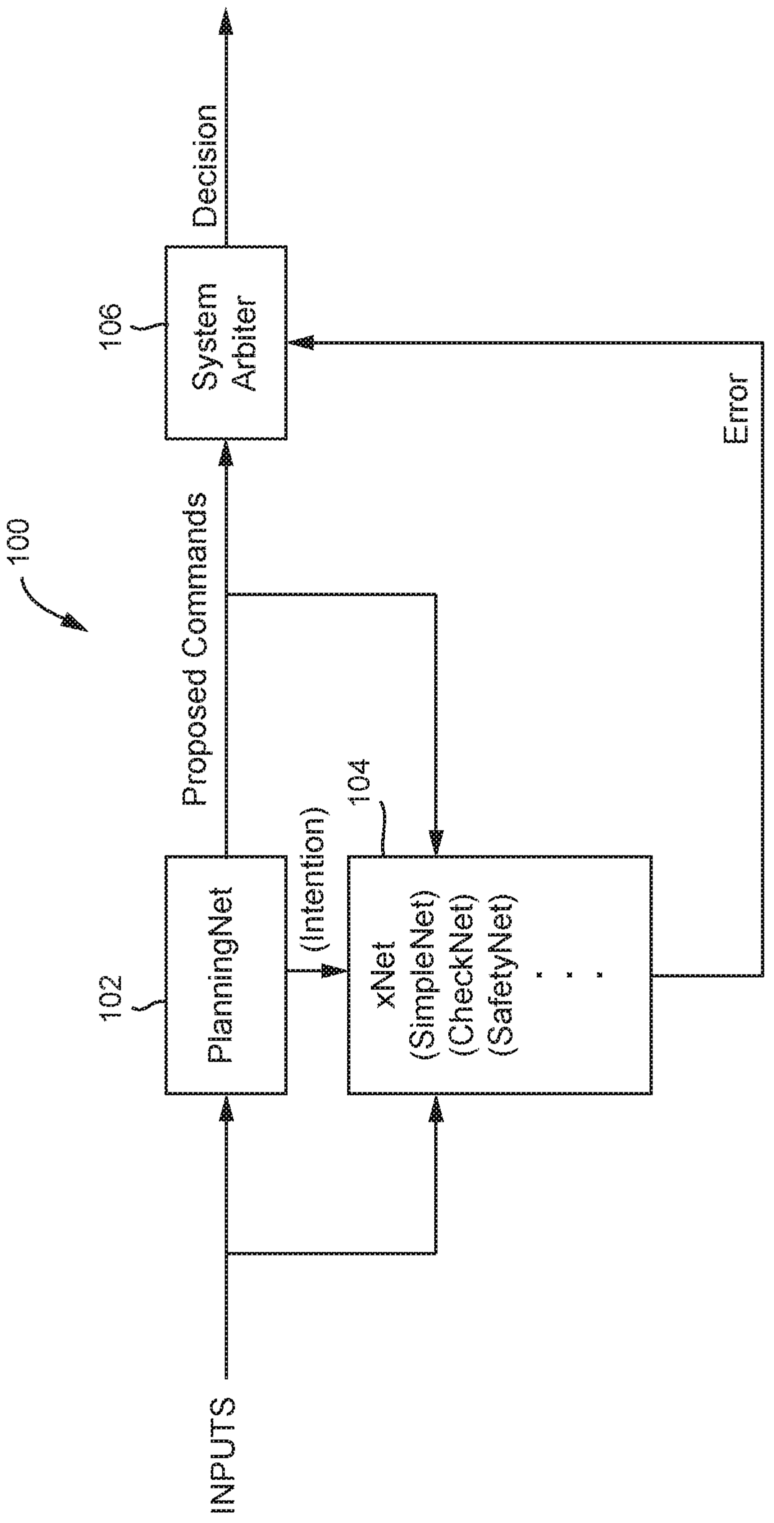
FIG. 1 shows an example non-limiting block diagram of an automated driving system 100 including simplified machine learning redundancy.

FIG. 1 shows an autonomous driving system 100 including a main algorithm or deep learning (DL) action planner network(s) ("PlanningNet") 102 for processing inputs and planning a course of action. NVIDIA's "DriveNet" and "PilotNet" are examples of such neural network-based systems that provide a forward-path neural network 102. Such networks can detect objects, lanes etc. See e.g., Bojarski et al., "End to end learning for self-driving cars" (Apr. 25, 2016, arXiv:1604.07316); Bojarski et al., "Explaining How a Deep Neural Network Trained with End-to-End Learning Steers a Car" (Apr. 25, 2017, https://arxiv.org/pdf/1704.07911.pdf). However, the example non-limiting embodiments are not limited to such detailed implementations. In particular, some implementations outlined below have applicability and usefulness in cases where a primary network is other than a planner or action network. Nevertheless, for purposes of exemplary illustration, the following description will rely on a non-limiting embodiment in which the primary network is a planning or action network such as for controlling the path of an autonomous vehicle.

FIG. 1 shows the addition of one or more, in some cases simpler, secondary ("xNet") machine learning objects such as neural networks 104 working in a diverse redundancy configuration to detect hardware random faults and/or hardware and/or software (SW) systematic faults in the a planning/action neural network PlanningNet network 102.

A number of broad configurations are provided for the secondary networks or other machine learning objects 104 (or other functionality of a common machine learning object), with different advantages and disadvantages of each:

1) SimpleNet: a lower precision version of the PlanningNet 102 that has similar training as PlanningNet and verifies the outputs of PlanningNet while reducing system requirements to operate plural high resolution networks or other machine learning objects. This arrangement takes advantage of the reduced probability that both higher resolution and lower resolution machine learning objects will misbehave in the same manner
2) CheckNet: implements plausibility checks on the output of PlanningNet versus the input conditions using a back-computation perspective.
3) SafetyNet: checks the decisions of PlanningNet (e.g., assessing the safety of the actions PlanningNet proposes) using a different (e.g., inverse) perspective based on knowledge of dangerous situations and actions. As one example, PlanningNet 102 makes decisions based on how to drive, while SafetyNet makes its decisions based on how not to drive. Example non-limiting embodiments of PlanningNet supply intention information to SafetyNet so SafetyNet does not misinterpret decisions PlanningNet makes. SafetyNet can also in some embodiments be trained by a training set that reflects reckless driving scenarios (actual, simulated or both). SafetyNet may make its assessments largely independently of PlanningNet, and the output(s) of SafetyNet can be applied before actuation (e.g., using an arbiter to arbitrate between action planning completed by PlanningNet and SafetyNet's objections to PlanningNet's action planning to increase safety of the overall action planning of the system).
4) LegalNet: checks the decisions of PlanningNet using a legal perspective based on knowledge of local or other traffic rules, regulations, and legal requirements.
5) MoralNet: checks the decisions of PlanningNet using an ethical perspective based on knowledge of values and utility.

The xNets 104 introduced fall into the following exemplary types:

1) A network with the same perspective as PlanningNet (or main neural network) but equipped with or configured to perform at different capability levels, such as lower accuracy or precision, e.g., SimpleNet;

2) A network with a different perspective that can include inverse perspective(s), e.g., SafetyNet ("how not to drive" is an example of inverse);
3) A network that performs plausibility checks including, without limitation: sanity checks, range checks, etc., e.g., CheckNet;
4) A network that considers a different aspect of a situation separately and/or redundantly evaluated by another xNet, e.g., LegalNet, MoralNet.

As a bonus or a secondary goal, these secondary network(s) 104 can detect hardware (HW) random and systematic faults in addition to software systematic faults.

Such secondary networks 104 may use traditional machine learning models or neural networks including but not limited to DNNs (deep neural networks), or a mix of those. There are a wide variety of neural networks, including by way of non-limiting example CNNs (Convolutional Neural Networks), RNNs (recurrent neural networks), recursive neural networks, etc. To simplify, this specification refers to them as "neural networks." The example non-limiting embodiments herein are presented in the context of cars (vehicles) and autonomous driving but the technology is applicable to any autonomous or non-autonomous computer system.

In some such example non-limiting implementations, the additional xNet networks 104 provide a different perspective(s). In some cases, the different perspective(s) can be inverse (e.g., how not to drive). In other examples, the different perspective(s) can be broader, such as the ethical considerations of executing the primary network outputs, the legal ramifications of doing so, etc. Training the additional network(s) appropriately provides the different perspective(s) and different objective(s). For example, in one implementation, an adversarial reckless driving neural network (a network that was trained to drive recklessly) might be used to train SafetyNet 104 so that it will recognize and prevent reckless outputs from a properly-trained driving PlanningNet neural network 102. The reckless driving neural network is an example of an adversarial neural network that works against another network or program to trick or defeat it.

Redundancy in Safety Critical Systems

As discussed above, a basic scenario is shown in FIG. 1.

The redundant network xNet 104 can be generated using one of a number of techniques and options.

Not all xNet networks need to be used for verification or validation of output from the main or planning neural network 102. Some may accept exactly the same or similar inputs as the main forward network(s), but be structured to analyze the inputs from a different perspective or in a different way. The outputs of such networks can then be combined or substituted or further processed in various ways with the output(s) of some or all of the main forward network(s).

In some example non-limiting embodiments, the additional xNet network(s) are trained differently for a different purpose. The goal or intention of the additional network(s) is/are different than the goals/intentions of the primary network(s). The additional networks could have different inputs, the same inputs or a combination of those. The primary network may, in some implementations, produce special outputs (e.g., intention) just for monitoring by the additional network(s). In some implementations, the only inputs to the xNet network(s) are the outputs of the primary network, and the xNet network(s) is/are able to detect unsafe conditions merely by observing the outputs of the primary network.

In some example non-limiting implementations, the time scale between the primary PlanningNet or other network(s) and the secondary network(s) need not be the same. For example, in some implementations, the secondary network(s) is/are faster acting than the primary network(s) so that diagnostics performed by the secondary network(s) can be applied very rapidly to prevent unsafe conditions from occurring as a result of outputs from the primary PlanningNet or other network(s). In other example implementations, the secondary network(s) is/are slower acting than the primary network(s) to allow the secondary network(s) to analyze a sequence of primary network actions before judging or intervening.

In some embodiments, xNet 104 can be a copy of PlanningNet 102 used in a symmetrical redundant configuration. In another example, xNet 104 can be a "SimpleNet"—i.e., a reduced precision version of PlanningNet 102 that can be trained on the same data set as PlanningNet. The lower precision SimpleNet can perform at least some calculations at lower precision than PlanningNet, but the objective is not necessarily reduced accuracy and reduced power. Rather, in some example non-limiting embodiments, lower precision provides an additional type of diversity while still providing sufficient resolution to provide comparable results that can be used to check PlanningNet. For example, the main PlanningNet neural network(s) 102 might be a high precision neural network(s), whereas the additional neural network(s) 104 such as SimpleNet could be a lower precision neural network(s).

In some example non-limiting implementations, SimpleNet is used to check that the output of PlanningNet 102 is within certain bounds and will be able to detect large deviations which could be indications of systematic or random errors. Precision, however, may be limited in some example implementations. As SimpleNet has the same forward perspective as the PlanningNet 102 network, it can provide coverage for random hardware faults with more quantifiable coverage.

xNet 104 in another non-limiting embodiment could be a CheckNet that uses an inverse perspective. An underlying assumption is that route-planning and vehicle control, based on camera inputs (as may be typically performed by PlanningNet 102), are complex tasks but verifying the final outcome, such as the direction of the vehicle, is simpler. This will result in a simpler, less costly, CheckNet 104 network. To illustrate with an analogy, in a program to invert a matrix it is a complex task to invert a large matrix but checking that the result is correct is much simpler.

Another example non-limiting embodiment uses SafetyNet—a neural network whose primary goal is detection of the PlanningNet 102 software systematic faults and mostly for situations that the PlanningNet is not programmed or trained for. Such a SafetyNet works in parallel with PlanningNet or other main neural network (and may use the same object detection mechanisms) but analyzes inputs from a different perspective or approach (e.g., how not to drive). The fault coverage of such a SafetyNet network is training dependent and is the main area of complexity.

In some non-limiting embodiments, SafetyNet is not the final top-level checker. It can be a self-checking mechanism (perhaps, in combination with a hand-coded safety response system) in each subsystem of a duplicated, mission/backup system.

In some example non-limiting embodiments, the output of xNet 104 can be used to train PlanningNet 102 and/or other network(s). As an example, xNet 104 could be used for reinforcement learning in a feedback loop with PlanningNet 102.

Table 1 below summarizes aspects of different example non-limiting network choices.

TABLE 1

Summary of xNet options

| | | | Coverage | | |
|---|---|---|---|---|---|
| | Redundancy | Training | HW random | Systematic faults | |
| Network | Type | Complexity | faults | HW | SW |
| PlanningNet | Simple duplication | None (same copy) | High | Very low | Very low |
| SimpleNet | Duplication with reduced complexity | Low (just reduced precision) | High | Low | Low or very low |
| CheckNet | Plausibility | Medium | Medium | Medium | Medium |
| SafetyNet | Safety viewpoint | High | High | High | High |
| LegalNet | Legality viewpoint | Medium | High | High | High |
| MoralNet | Morality viewpoint | High (not well defined) | High | High | High |

A well-designed system could in some non-limiting contexts combine a selection of these secondary networks that would result in high coverage in all fault categories. Thus, possible implementations include, without limitation, any and all combinatorial combinations of two, three, four, five and six networks such as for example:

PlanningNet+SimpleNet
PlanningNet+CheckNet
PlanningNet+SafetyNet
PlanningNet+LegalNet
PlanningNet+MoralNet
PlanningNet+SimpleNet+CheckNet
PlanningNet+SimpleNet+SafetyNet
PlanningNet+SimpleNet+LegalNet
PlanningNet+SimpleNet+MoralNet
PlanningNet+CheckNet+SafetyNet
PlanningNet+CheckNet+LegalNet
PlanningNet+CheckNet+MoralNet
PlanningNet+SafetyNet+LegalNet
PlanningNet+SafetyNet+MoralNet
PlanningNet+LegalNet+MoralNet
PlanningNet+SimpleNet+CheckNet+SafetyNet
PlanningNet+SimpleNet+CheckNet+LegalNet
PlanningNet+SimpleNet+CheckNet+MoralNet
PlanningNet+CheckNet+SafetyNet+LegalNet
PlanningNet+CheckNet+SafetyNet+MoralNet
PlanningNet+SafetyNet+LegalNet+MoralNet
PlanningNet+SimpleNet+CheckNet+SafetyNet+LegalNet
PlanningNet+SimpleNet+CheckNet+SafetyNet+MoralNet
PlanningNet+CheckNet+SafetyNet+LegalNet+MoralNet
PlanningNet+SimpleNet+CheckNet+LegalNet+MoralNet
PlanningNet+SimpleNet+CheckNet+SafetyNet+MoralNet
PlanningNet+SimpleNet+CheckNet+SafetyNet+LegalNet+MoralNet.

Each of the above-listed items and associated functions can be provided/performed by at least one processor (102 and/or 104) executing instructions stored in memory 174.

Although only one instance of each network is shown above, plural instances of any of the networks can be used in any particular implementations. Additional xNet(s) not named above could be included in the above combinations in addition to or in place of networks named above.

In the above implementations, the PlanningNet network 102 can be configured to accept, as additional input, outputs from any or all of the additional networks and/or an arbiter 106 may accept as input, outputs from any or all of the additional networks. Furthermore, some of the additional networks may accept, as inputs, outputs from other ones of the additional networks. For example (and without limitation), SimpleNet might provide an output for analysis by LegalNet, or LegalNet might provide an output for analysis by MoralNet.

In some implementations, depending on training, two or more additional "xNet" networks could be combined into a single deep neural network (DNN) xNet. For example, it might be desirable in some implementations to combine LegalNet and MoralNet into a single DNN. In other implementations, the functions of CheckNet and SafetyNet could be combined into a single DNN. In still other implementations, diversity is maximized by providing several different networks, each trained with different data and running on different hardware.

Example non-limiting implementations provide increased safety by providing an architecture including a primary function and a diagnostic function. In other implementations, it is possible to have multiple additional networks and provide voting or arbitration to decide which one or ones of the decisions of the additional networks will control, if any.

In one example non-limiting implementation, there is a primary function and one or more checker functions. Any decision of the primary function is checked using the checker functions.

In example non-limiting embodiments, any desired structure or training technique may be used to train the additional network(s). As one example, in addition to the video input 162 from a human-driven course, it is possible to put an eye tracking device (e.g., a head mounted display or HMD 164) on the human driver and capture where he/she is looking while driving and feed that along with the video to PlanningNet 102. See FIG. 1A. This will tell PlanningNet 102 where a human driver would be looking. Such input can be used to correlate consistent behavior observed from an attentive driver, and compared to behavior observed from frequently distracted drivers, for example.

In some implementations, the additional "xNet" network(s) are run on different hardware than the main planning network(s). For example, a main planning network might execute on the CPU 170 of a given processor system, whereas the additional network(s) may run on a GPU 172, as shown in FIG. 1B. In other arrangements, the main planning network(s) may run on a GPU(s) 172 and the additional network(s) may run on the CPU(s) 170, as shown in FIG. 1C. In these arrangements, the CPU 170 and GPU 172 can execute instructions stored in a common shared memory 174, and/or the CPU and GPU can each have their own memory(ies). In other implementations, both (all) neural networks run on the same hardware and diversity is achieved through the different network structures/complexity and/or the structure of different networks being trained using different data. In such implementations, even though the plural neural networks execute on the same hardware (i.e., the very same processor or redundant but similar or identical processors), there may be separate processes that are trained using different training data to provide diversity.

It might be possible in some implementations to diversify a single network by training it on different data in a different mode and then merging the results. In relevant contexts, the term "processor" can be construed to include one or more central processing units (CPUs), graphics processing units (GPUs), Deep Learning Accelerators (DLAs), Programmable Vision Accelerators PVAs, programmable gate arrays (PGAs), application specific integrated circuit (ASIC) functions, or any combination(s) of these.

While some embodiments use multiple machine learning objects such as DNN's operating in a mission/checker configuration, other implementations could use a common machine learning object(s). For example, some embodiments may combine smaller networks into fewer larger networks. The splitting of machine learning objects such as deep neural networks has advantages if different hardware is used to perform different functions, but if the hardware is sufficiently robust and reliable to not require detection of random hardware errors through duplication, some embodiments can instead concentrate on systematic fault avoidance. In such contexts, there may in some particular instances be no advantages between training multiple networks and training a single network with antagonistic data.

Figure 1A:
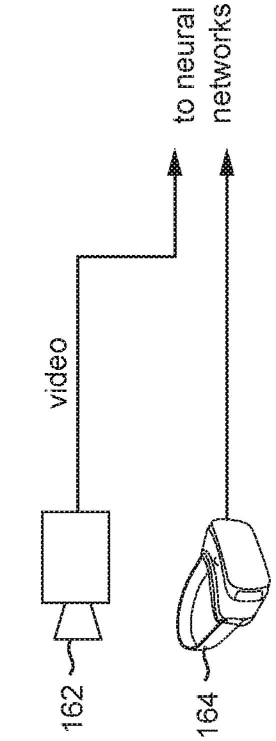
FIG. 1A shows example non-limiting video and head mounted display inputs for the FIG. 1 system.
Figure 1B:
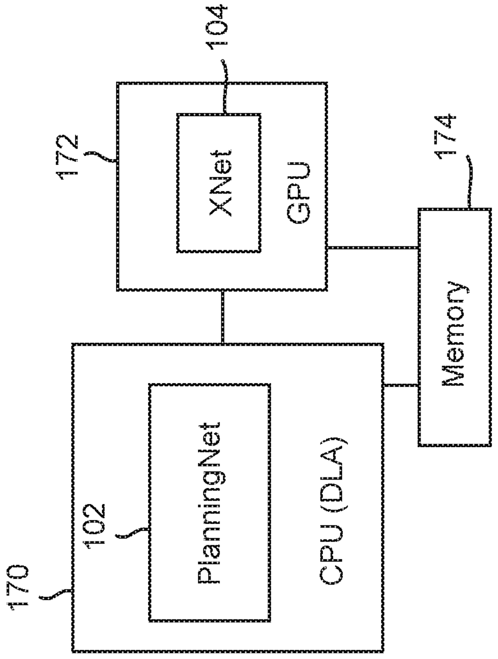
FIG. 1B shows an example non-limiting hardware processor implementation.
Figure 1C:
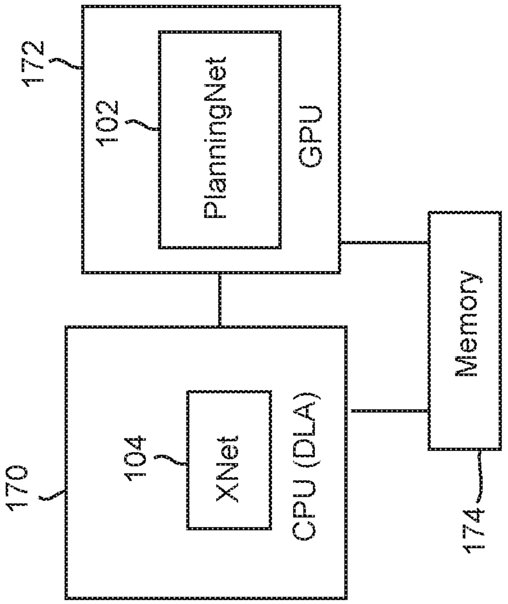
FIG. 1C shows another example non-limiting hardware processor implementation.

For example, in the FIG. 1*a* system, assume there are two networks trained separately: one (PlanningNet 102) to plan a path and another (xNet 104) configured to check that the path planned by PlanningNet 102 is not going to lead to an accident or other unsafe condition. In this particular embodiment, PlanningNet 102 generates actuator commands and xNet 104 generates an error signal which controls switching to a backup.

Figure 1D:
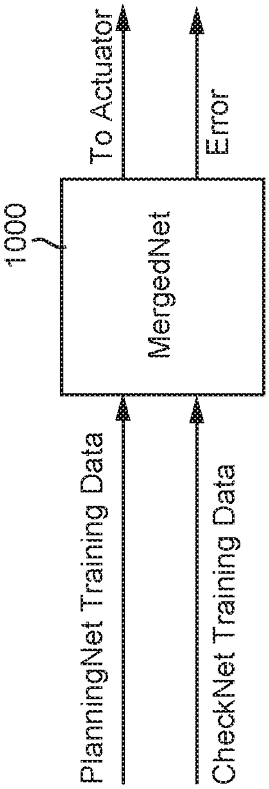
FIG. 1D shows an example implementation where different machine learning objects are merged into a common machine learning object.

In one particular example, plural DNN's are merged into a single DNN with shared weights to enable the various different models to run more efficiently on the same hardware. For example, FIG. 1D shows use of the same data to train a single network "mergedNet" by applying the training data used on "PlanningNet" 102 to generate the actuator output and the training data for CheckNet to generate the error output. For example, the system can be designed so the error signal responds correctly to grossly divergent sensor data by introducing errors into one or more sensor paths. This arrangement can in some circumstances provide the same performance with a single network as with multiple networks. Sharing of hardware resources could potentially lead to better performance. Thus, in some example embodiments, different instructions (or different neural network models or coefficients) executing on the same hardware in the context of a common machine learning object such as a unitary deep neural network could be used to provide diverse (e.g., antagonistic) results from different perspectives, based on different training and/or by processing different sensor inputs.

Example Self-Driving Autonomous Vehicle

Figure 1E:
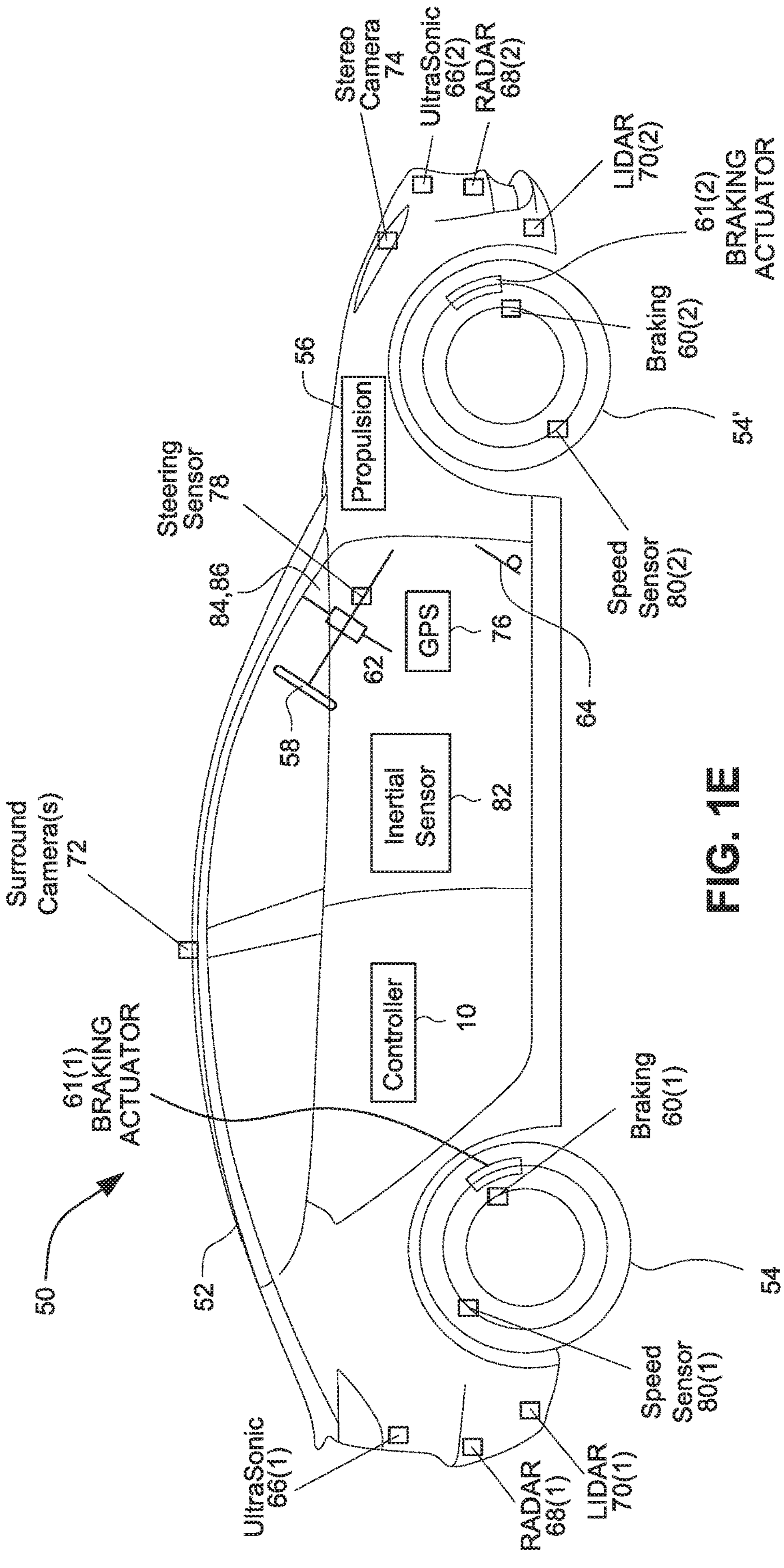
FIG. 1E shows an example autonomous self-driving vehicle.

For sake of context, FIG. 1E shows an example self-driving vehicle 50 in which the present technology can be used. Vehicle 50 may be any kind of vehicle, manned or unmanned, but in the example shown comprises a passenger vehicle such as a car or truck that can accept a human driver and in some cases also human passengers. Vehicle 50 includes a vehicle body 52 suspended on four wheels 54 and associated axles. A propulsion system 56 such as an internal combustion engine, hybrid electric power plant or the like is connected to drive some or all of wheels 54 via a drive train including a transmission (not shown). A steering wheel 58 is used to steer some or all of wheels 54 in order to direct vehicle 50 along a desired path when the propulsion system 56 is operating and engaged to propel the vehicle. A controller 10 provides autonomous self-driving capabilities in response to signals continuously provided in real time from an array of sensors.

Controller 10 is essentially an onboard supercomputer that operates in real time to process sensor signals and output autonomous operation commands to self-drive vehicle 50 and/or assist the human vehicle driver in driving vehicle 50. It may have the structure shown in FIG. 1B including one or more CPUs, one or more GPUs and memory. Controller 10 operates vehicle brakes 60 via one or more braking actuators 61, operates steering mechanism 58 via a steering actuator 62, and operates propulsion unit 56 which also receives an accelerator/throttle actuation signal 64.

Controller 10 provides autonomous driving outputs in response to an array of sensed inputs including for example the outputs of:

One or more ultrasonic sensors 66

One or more RADAR sensors 68

One or more LIDAR (Light Detection and Ranging) sensors 70

One or more surround cameras 72 (typically such cameras are located at various places on vehicle body 52 to image areas all around the vehicle body)

One or more stereo cameras 74 (at least one such stereo camera faces forward to provide depth-perception object detection and recognition in the path of the vehicle)

A GPS (Global Positioning System) unit 76 provides location coordinates

A steering sensor 78 detects the steering angle

Speed sensors 80 (one for each of the wheels 54)

An inertial sensor 82 that monitors movement of vehicle body 52 (this sensor can be for example an accelerometer(s) and/or a gyrosensor(s) and/or a magnetic compass(es))

Other.

Controller 10 processes the sensor outputs identified above to detect objects, map locations, plan paths and routes, avoid collisions, and perform other driving related tasks.

Controller 10 also receives inputs from an instrument cluster 84 and can provide human-perceptible outputs to a human operator via an HMI display(s) 86, an audible annunciator, a loudspeaker and/or other means.

SafetyNet 200

Figure 2:
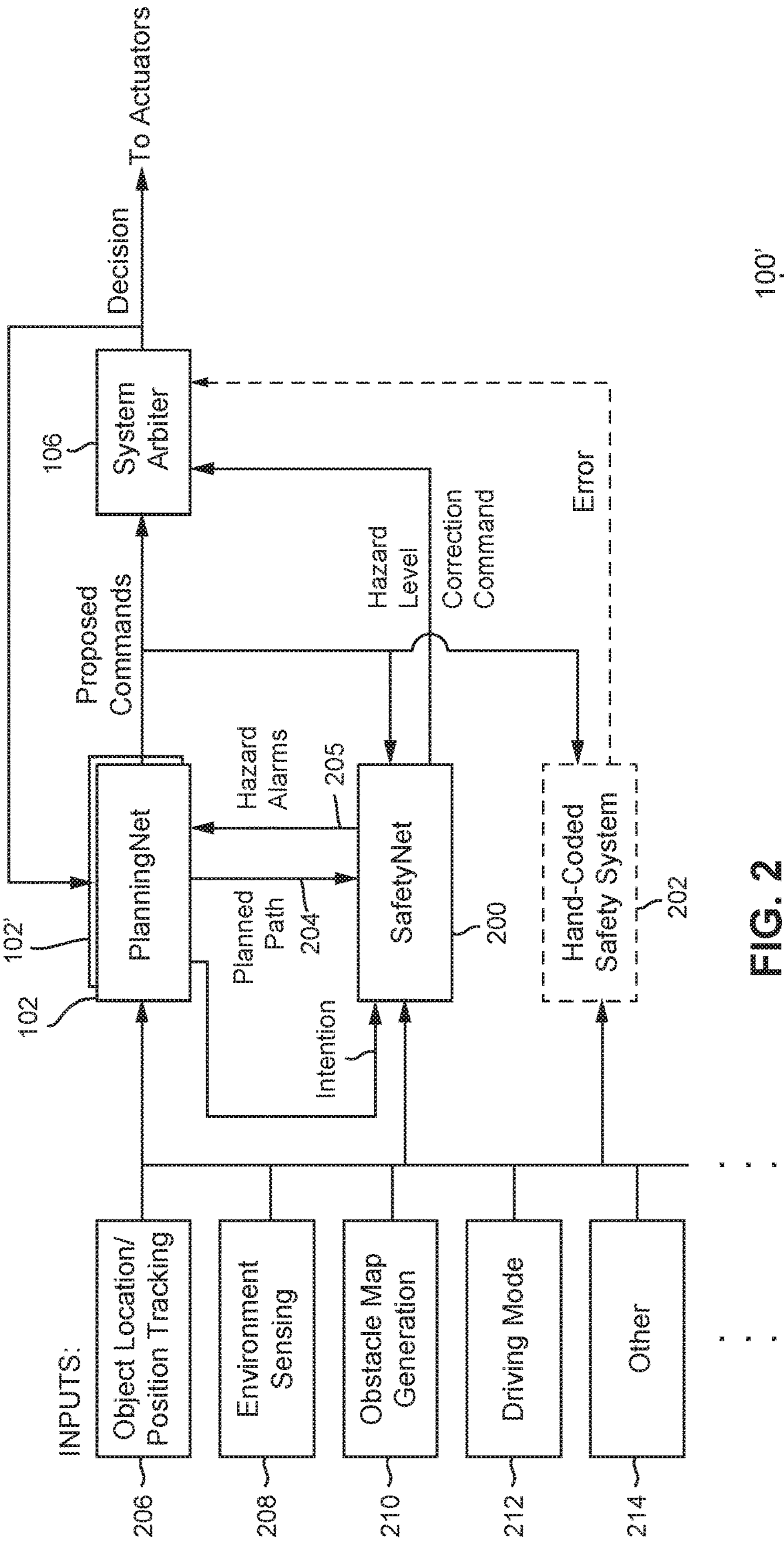
FIG. 2 shows an example non-limiting implementation including a SafetyNet neural network.

FIG. 2 shows an example non-limiting embodiment including a forward path planning neural network (PlanningNet 102) and a reverse path planning neural network (SafetyNet 200). PlanningNet 102 includes functionality such as object detection, collision avoidance, action and route planning and component actuation to autonomously drive a vehicle or, in some embodiments, assist a human driver in performing certain driving tasks such as selectively-activated autopilot, adaptive cruise control and lane keeping. SafetyNet 200 analyzes outputs of PlanningNet 102 for safety, and generates error signals upon SafetyNet determining that PlanningNet 102 output(s) will or may cause unsafe operations.

Background and Motivation

In the context of PlanningNet 102, consider a software-based neural network as an example. The idea of a deep neural network (DNN) as the only actor may sometimes be of concern because it is not always possible to predict what the planning network might do.

To deal with unfamiliar, unforeseen and unforeseeable situations, a hand-coded (e.g., rule-based) safety mechanism 202 can be put in place. One could feed the output of both the planning network 102 and the hand-coded safety mechanism 202 to a final checker/arbiter 106 and the checker/arbiter could take the action output from the planning network 102's DNN unless the arbiter 106 determines performing the output would be more dangerous than the hand coded system 202's actions.

FIG. 2 provides an additional SafetyNet neural network 200 that looks at the task of driving from the safety perspective. This SafetyNet 200 is like a passenger that doesn't 'think' or 'know' how/where (with respect to the final destination) to drive, but rather just 'thinks' and assesses the hazard-level of the (immediate) next actions, and in particular, the one the PlanningNet 102 is intending to take.

Figure 2A:
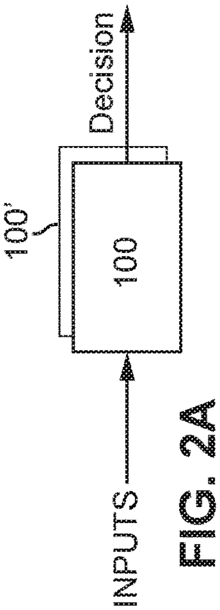
FIG. 2A shows example non-limiting redundancy including a backup system(s) 100.

SafetyNet 200 can be the self-checking mechanism (e.g., in combination with or instead of a hand coded safety response system 202) in each subsystem of a duplicated (mission and backup) system, including a mission subsystem 100 and a backup subsystem 100' (see FIG. 2A).

This general concept is similar in some ways to the interlocking system used in railway systems which use a combination of hardware and software safety methods. For example, relays that turn on a green light can never activate if there is a train present in the path ahead of that light. (This is analogous to an automotive ASIL decomposition in the ISO 26262 standard.) Such hardware preventative safety methods are successful but have limited coverage due to the limited visibility each point has to the overall situation and the complexity required to enhance it.

On the software side, safety can be—and generally in the past has been—implemented through hand coded safety checks 202, like properties and assertions. Enumerating various combinations of situations and the actions taken in each combination that can lead to a hazard is generally more cumbersome if not intractable in autonomous cars compared to trains because trains are confined to certain routes and an autonomous train would have to deal with far fewer situations and parameters.

As an example from aviation, the following is from a Wall Street Journal article published on Jul. 10, 2016:

> Since 2009, Airbus has marketed a proprietary system, now installed on about 430 airliners, that automatically assesses speed, altitude, flight-control settings, runway topography, winds and parameters eight times per second. The goal is to warn pilots beforehand that they likely won't be able to safely stop on a runway, and automatically exert maximum braking force on the ground when necessary. (http://www.wsj.com/articles/boeing-airbus-clash-over-safety-system-1468198041)

One way of looking at this example is as follows. The safety mechanism described above doesn't know how to fly or land the airplane; instead it knows whether the current approach will lead to an unsafe landing or not. This is a different perspective than "how to fly". It is "how not to fly". When a 'how not to fly' situation is detected, an alarm is raised (and one possible corrective action is taken in the above case, namely applying maximum automatic braking).

The SafetyNet 200 shown in FIG. 2 follows this complementary approach in a machine learning context to implement a diverse redundancy scheme while providing an additional neural network that can be trained and uses machine learning to increase safety.

Discussion

Example non-limiting embodiments provide a SafetyNet neural network 200 that augments, and perhaps in some applications may replace the hand-coded safety checks 202. SafetyNet 200 is a software that runs at the system level and as input takes high-level situational information and the tentative plan of action from PlanningNet 102, and checks if such action or series of actions would lead to a hazardous situation. If it does, SafetyNet 200 would act as an alarm to keep that tentative action from becoming a real one. Just like a virtual alert and monitoring passenger, SafetyNet doesn't work against the PlanningNet but observes PlanningNet's behavior and warns or takes action if it detects that PlanningNet's actions lead to a hazard (an "intention" feed from PlanningNet to SafetyNet can be used to make sure PlanningNet's actions are not misunderstood).

Example non-limiting embodiments thus provide, in additional to a main neural network such as PlanningNet 102, one or more additional neural network(s) coupled to the main neural network that provides/defines specific, in some cases negative, functionality such as "how not to drive." Such additional neural network(s) may have no knowledge or experience on how to drive, but are trained only to identify and detect various aspects of how not to drive. Such additional "back seat driver" neural network(s) 200 are preferably trained on different data than the data used to train the main PlanningNet 102 network. The additional neural network(s) 200 is/are not only diverse (i.e., different) networks (in some cases operating on different processors), but they are also trained on diverse data. This means that the additional neural network(s) 200 are trained on different data than the primary PlanningNet 102 network(s) is trained on. For example, in the case of an autonomous vehicle environment, the main PlanningNet 102 neural network(s) is trained on data that allows the network to learn how to drive, whereas an additional SafetyNet 200 neural network may be trained on dangerous driving scenarios by which it learns how not to drive.

In some implementations, the additional neural network(s) such as SafetyNet 200 thus provide a complementary function to a main neural network(s) such as PlanningNet 102. Such complementary function may be as in for example, the nature of SafetyNet 200 checking the outputs of the main PlanningNet 102 neural network(s) and recognizing when the outputs are unsafe, inadvisable, or otherwise undesirable. But not all additional neural network(s) need to be complementary.

Figure 3:
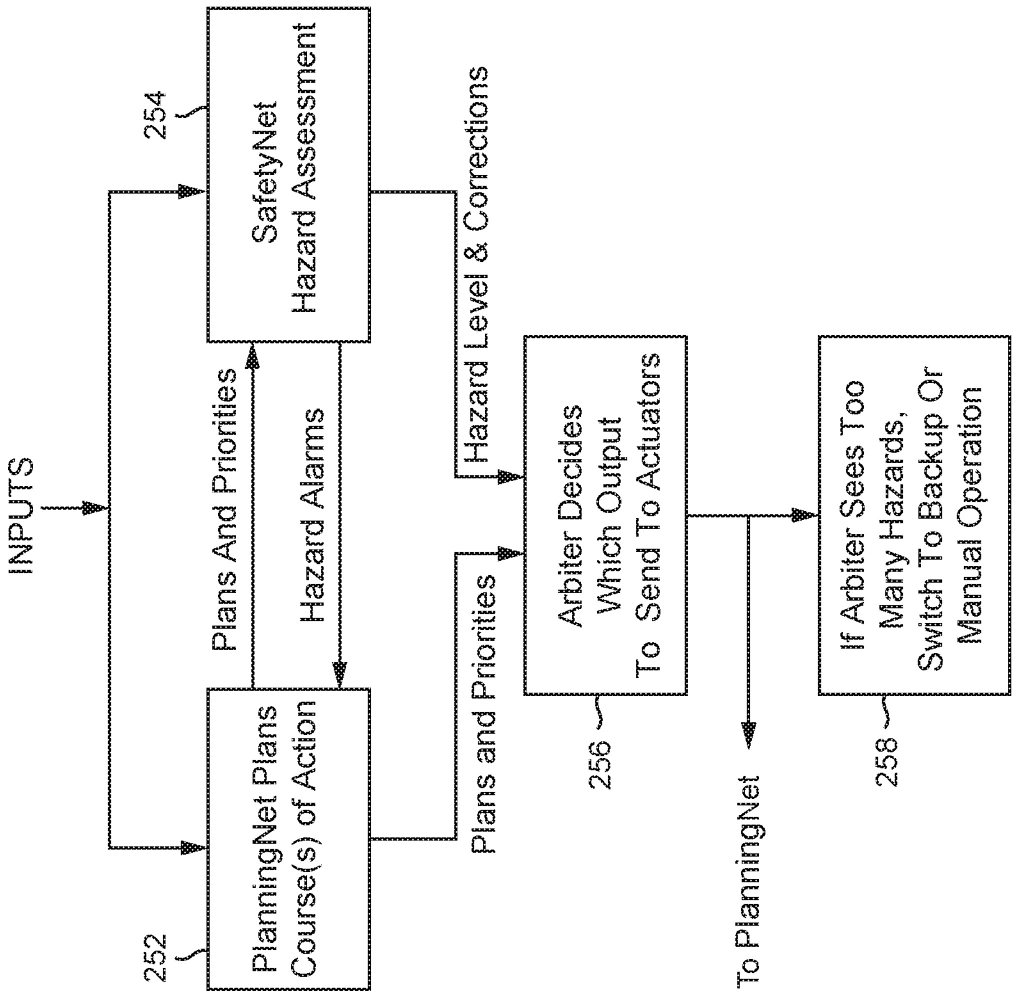
FIG. 3 shows example collaboration and arbitration between PlanningNet and SafetyNet.
Figure 3A:
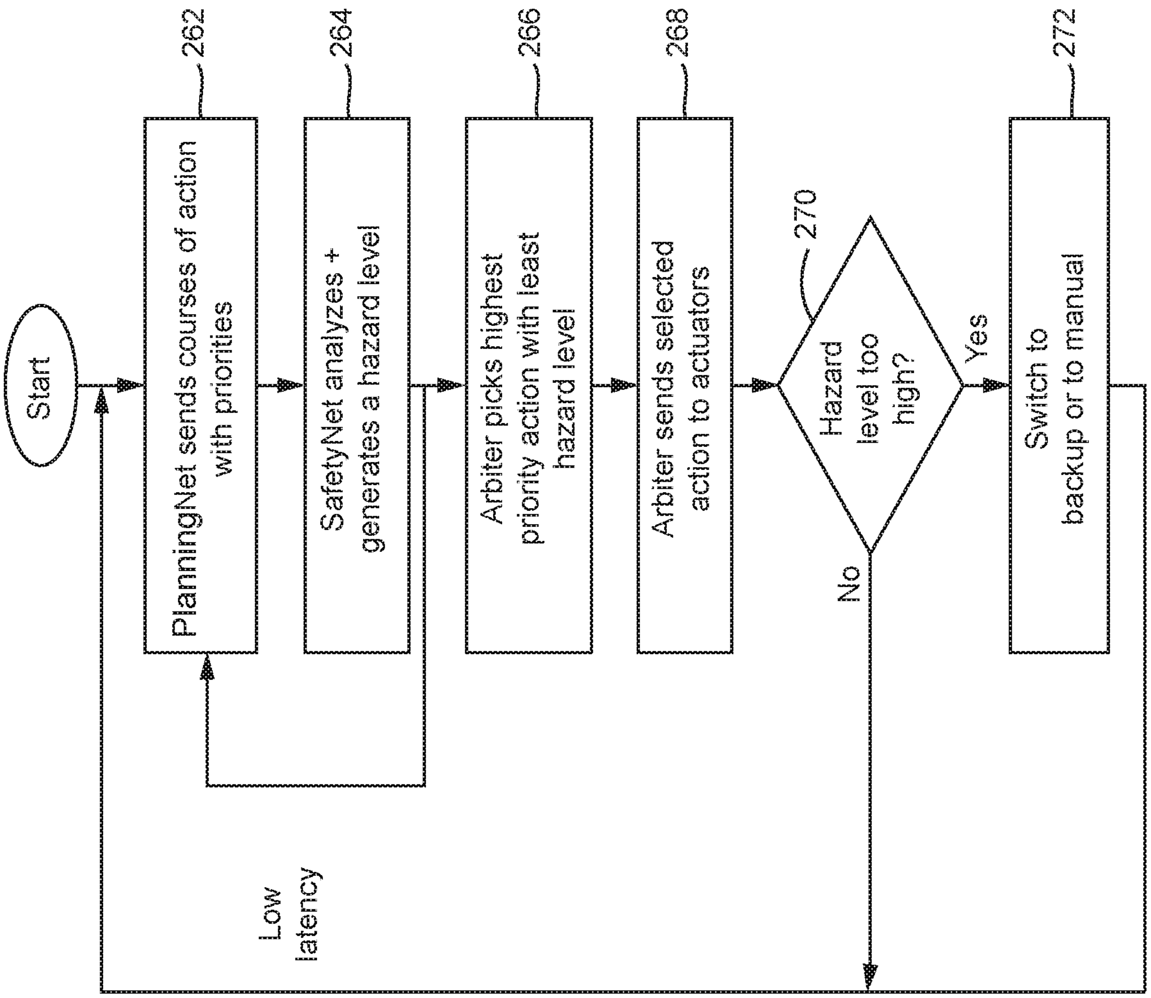
FIG. 3A shows an example non-limiting flowchart of SafetyNet system operation.

Here are some possible ways SafetyNet 200 can be designed to interact with the system to set a new course of action:

1) PlanningNet 102 has two or more courses of action ("Decision") planned at all times (FIG. 3 block 252, FIG. 3A block 262), with its own recommended priority. PlanningNet 102 sends these courses of action with priorities to SafetyNet 200. SafetyNet 200 analyzes the various courses of action provided by PlanningNet 102 and generates a hazard level (FIG. 3 block 254; FIG. 3A block 264) for each of the recommended courses of action. SafetyNet 200's output together with the outputs of PlanningNet 102 are presented to a top-level system arbiter 106 (which in an example non limiting embodiment is made of the simplest and highest safety level compliant hardware and software components). This arbiter 106 makes the final decision on which commands to send to the actuators (e.g., throttle, steering, braking) (FIG. 3 block 256; FIG. 3A block 266) and selects the highest priority action (as prioritized by PlanningNet 102) that has the least hazard level (as classified by SafetyNet 200) Ranking differences can be small. In some non-limiting embodiments, the absolute hazard level value at which the arbiter 106 starts looking at the rankings and the difference threshold for making the decision may be set based on testing and heuristics. SafetyNet 200 thus ranks each of Planning- Net 102's alternative plans of action in terms of safety. Arbiter 106 can decide, based on those rankings, which plan of action to accept and use to control the vehicle (see FIG. 3A block 268).

2) Hazard alarm output(s) of SafetyNet 200 is (are) fed back to PlanningNet 102 over link 205 and PlanningNet generates a new course in response to an alarm. In this case, round-trip latency (from alarm to corrected action) should not exceed a certain duration (e.g., 100 ms); in the meantime, the top-level system arbiter 106 keeps the actuator inputs the same. In some non-limiting embodiments, PlanningNet 102 should react within a small number (e.g., 3) frames (assuming 33 ms per frame). If PlanningNet 102 doesn't react that quickly, or if its new course still raises an alarm, the top-level system arbiter 106 switches to a back-up system 100' or to manual control (block 258).

3) SafetyNet 200 is enhanced in some non-limiting embodiments to also provide alternate corrective actions. In this case, it is not a general path planning software component that an autonomous car has, but is instead a short-term path correction component that reacts quickly (e.g., in milliseconds) and proposes corrections that last for a finite period of time (e.g., 1 or 2 seconds) just to cover for the hazardous cases in which PlanningNet 102 misjudged or malfunctioned. In this case, the top-level system arbiter 106 feeds the actuators from SafetyNet 200 only for this short period of time before it decides whether it can switch back to the primary PlanningNet 200, or to a back-up system 100' (FIG. 3A block 272). In other words, arbiter 106 substitutes the outputs of SafetyNet 200 for the outputs of PlanningNet 102 temporarily in order to assure safe operation. If SafetyNet 200 detects that PlanningNet 102 continues to generate unsafe outputs, SafetyNet 200 (or the arbiter 106) can take PlanningNet 102 out of loop by activating a backup PlanningNet 102' or asking the human driver, if present, to take over operation of the vehicle.

Example Input

In the context of an autonomous car, SafetyNet 200 takes, for example, the following inputs, many of which are the output of various other pieces of hardware/software (Deep Learning, or other):

- Location and path/speed of various objects that were detected (object location/position tracking 206 including FIG. 1E sensors 66, 68, 70, 72, 74, 76)
- Weather, road, and visibility conditions (to whatever level they can be deduced) (environment sensing 208 including FIG. 1E sensors 72, 74, temperature sensors, moisture sensors, etc.)
- Occupancy grid from processed sensor outputs, or the fused/combined (already voted on) grid (i.e., obstacle map generation 210 including GPS 76)
- Planned path from the PlanningNet 102
- The upcoming steering, throttle, and brake actuation commands (the past few previous ones can be saved internally). If the PlanningNet 102 is capable of generating multiple proposed actions (in some priority), they can all be fed to SafetyNet 200 over planned path 204 for evaluation.
- Selected driving mode 212: comfort/normal/spirited/sport (or equivalent)
- Other.

Example Output

In some embodiments, the primary output of SafetyNet 200 is a hazard level, e.g., a scalar value between 0.0 to 1.0 in one non-limiting embodiment. A hazard detection is indicated by a high hazard level which raises an alarm to the top-level system arbiter 106. If multiple proposed actions are presented by PlanningNet 102, SafetyNet 200 can output the hazard level for each. The chosen action selected by the arbiter 106 can or should be fed back to PlanningNet 102. Some non-limiting embodiments also have secondary correction command outputs that correct the steering, throttle, and/or brake commands generated by PlanningNet 102. In other example non-limiting embodiments, the output of SafetyNet 200 is applied to a circuit, processing block, or other component other than or in addition to an arbiter 106. For example, this SafetyNet 200 output could be used for training PlanningNet 102 or to provide other types of feedback into the system such as to implement reinforcement learning. Each signal or event that SafetyNet 200 generates which conflicts with the output of PlanningNet 102 is a potential machine learning opportunity. Such conflicts can be used to train PlanningNet 102 and/or some other network. For example, unacceptable results such as crashing, striking objects, causing injury or damage or creating undue human discomfort could define a reward system for reinforcement learning. Defining which results are "unacceptable" could depend on the context of driving mode (e.g., more aggressive driving such as faster acceleration or more lateral directional changes over a certain time period could be acceptable while operating in a "sporty" driving mode but unacceptable in a "normal" or "conservative" driving mode).

Training

The initial training of SafetyNet 200 can be performed by running the SafetyNet neural network in parallel with a hand-coded version 202 of a safety check through various scenarios.

Beyond that, reinforcement learning (RL) can be applied. This approach in this context provides a simulator that has cars taking all sorts of unsafe actions. Example non-limiting goals are (a) avoid a collision if possible, (b) if not in a collision, take evasive action that is the most comfortable/non-disruptive with some margin, (c) if in a collision, minimize severity/injury (to self and others). Reinforcement learning is performed against these goals. Autonomous cars using SafetyNet 200 figure out how to optimize for these goals more efficiently than having hand written code 202 that has to be revised for each new input. The SafetyNet 200 outputs are thus not necessarily used in this example embodiment to compare with the output of PlanningNet 102, but rather to detect or predict whether PlanningNet 102 outputs are likely to lead to an unsafe condition or event. SafetyNet 200 can be trained so it acquires an instinctual machine knowledge of unsafe actions.

Figure 3C:
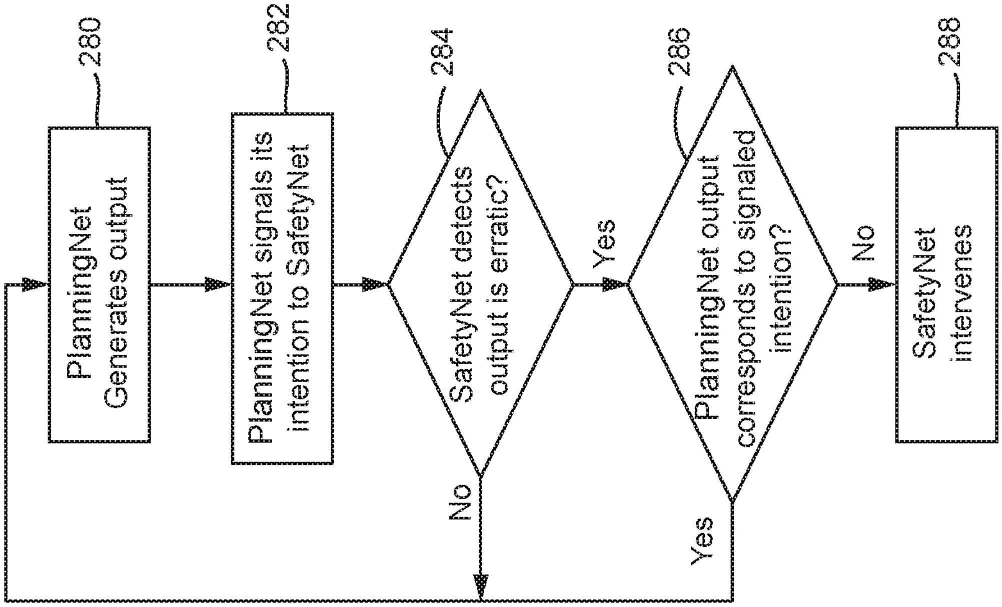
FIG. 3C shows example non-limiting use by SafetyNet of an intention signal generated by PlanningNet.
Figure 3B:
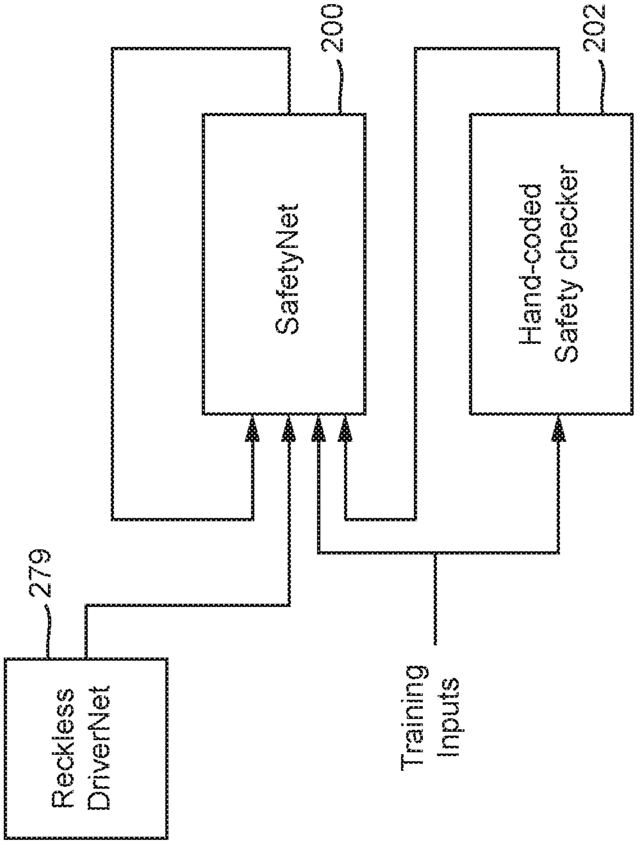
FIG. 3B shows example non-limiting SafetyNet training.

Creating hazardous situations in real life is dangerous or impossible, so it can be done off-line either using artificial scenarios such as animations or by some type of rule-based learning which amounts to the same thing It is possible to use rules to generate the "animations" (not images, but in the format of SafetyNet 200 inputs) which then are used to train the SafetyNet 200 network as shown in FIG. 3B. Another possibility is to collect and learn from accident scenarios that occurred in real life which were not planned but rather the result of unfortunate circumstances.

It is possible in some implementations to gather real world data once a system is implemented in order to improve the training. For example, in the context of autonomous vehicles, a data collection system could be implemented to observe and record accident scenarios. Such accident scenario data could then be used to further train SafetyNet 200 to avoid such accidents. It would be possible for example to gather information about how to become a better driver. It would also be possible to gather information indicating when the primary network acted inappropriately or unsafely, or the human driver had to take over and recover the situation. The recordings of those potentially dangerous situations then become training data for the additional neural network(s). Thus it is possible to train on simulations, real world data, or a combination in order to develop threat assessments.

It might also be possible to train PlanningNet 102 with such hazardous training inputs. However, a problem with training PlanningNet 102 with the same artificial inputs is the possibility of overfitting the neural network, especially when combined with all sorts of other tasks that PlanningNet 102 performs. Generally speaking, overfitting results in the neural network increasing in complexity to provide low error rates for inputs that are similar to the training data, but generating large error rates for inputs that are not similar to the training data. An overfitted neural network has not been sufficiently generalized to respond to the full range of inputs that it needs to respond to.

To avoid overfitting, adversarial neural networks can be used to create hazardous scenarios by simulating a reckless driver which would represent a misbehaving PlanningNet 102. Such an adversarial neural network can be called RecklessdriverNet 279 of FIG. 3B. Other, well-known techniques for avoiding overfitting may be employed, as will be understood by those skilled in the art.

The PlanningNet 102 already includes functions of identifying different obstacles on the road and planning the path.

SafetyNet 200 in some embodiments is used to perform system-level decision error detection. It is the complement of the PlanningNet 102, and to function it may need those detected obstacles as input (perhaps from a different/redundant/simpler/diverse source). Training the two different networks using different data provides advantages that may not be otherwise obtained by attempting to train the same network using additional data.

PlanningNet 102 is the 'what to do next' algorithm or deep learning (DL) network that produces the intended actuator inputs. In some embodiments, this module inherently has "avoiding obstacles" and "avoiding accidents" as part of its functionality. In non-limiting embodiments, SafetyNet 200 does not know 'what to do next', rather it only knows 'what not to do next' to avoid obstacles and accidents, i.e., to stop the hazardous decisions. So SafetyNet 200 looks at things (inputs) from a different perspective and has different outputs, and hence it is a diverse network from PlanningNet 102. This diversity greatly reduces the chances that SafetyNet 200 will have systematic faults that would overlap with the PlanningNet 102 software-based systematic faults. To illustrate with an example, if both PlanningNet 102 and SafetyNet 200 miss 0.1% of hazardous situations, the diversity between them should make the missed cases non-overlapping so the combined system has a miss rate of for example 0.1%×0.1%=0.0001%. Moreover, SafetyNet 200 in some example non-limiting embodiments is a simpler neural network to fit to a simpler hardware.

Example non-limiting implementations of SafetyNet 200 are, in some embodiments, able to distinguish the intention of PlanningNet 102. For example, if PlanningNet 102 decides in an automotive environment to change lanes to the left, it signals to SafetyNet 200 that its intention is to get to the left lane to pass a vehicle that is in front. This is an indication to SafetyNet 200 that PlanningNet 102's decision to change lanes is disciplined. On the other hand, without any signaled intention, if PlanningNet 102 starts controlling the car to drift to the left, then SafetyNet 200 is able to detect that there is something wrong with PlanningNet 102. PlanningNet 102's intention may thus be a possible input to judge whether PlanningNet 102 is doing something erratic or undisciplined.

As shown in FIG. 3C, PlanningNet 102 can signal its intention by asserting a simple flag indicating that it is about to exercise control in what might otherwise appear to SafetyNet 200 to be abnormal (FIG. 3C blocks 280, 282). SafetyNet 200 can respond to the assertion of the flag by suppressing certain outputs it would otherwise generate if the intention flag were not asserted (FIG. 3C block 286). Asserting the intention flag could disable all outputs of SafetyNet 200 while the flag is set, or it could change the safety standard SafetyNet uses to evaluate the safety of PlanningNet 102's outputs (FIG. 3C block 288). For example, if PlanningNet 102 must undertake an immediate evasive maneuver to prevent the vehicle from striking an obstacle, PlanningNet can signal SafetyNet 200 of its intention. SafetyNet 200 can in response apply a relaxed safety standard when examining the SafetyNet 200 output to give PlanningNet the freedom to perform its evasive maneuver without interference by SafetyNet. SafetyNet 200 could still monitor some aspects of the safety of the maneuver, and signal back to PlanningNet 102 if SafetyNet determined that the maneuver was likely to violate a safety goal (e.g., it could cause an accident). PlanningNet 102's intention signaling could in other cases be more complex, for example indicating if the intention was a routine maneuver or an emergency maneuver. SafetyNet 200 could be trained to suspend or minimize any attempted override action if PlanningNet 102 informs it of an imminent emergency that requires evasive maneuvering. SafetyNet 200 at the same time could analyze incoming inputs to confirm that it detects the same threat that PlanningNet 102 is responding to, thereby confirming that SafetyNet is operating properly and efficiently.

Some Legal and Practical Constraints

In some scenarios, it may be difficult to train SafetyNet 200 on what not to do, without it knowing what is legal or can be done. Here are some simple examples:

1. Speed restricted zone. SafetyNet 200 can be trained that the car shouldn't go above the speed limit (what not to do). But in Europe when the speed limited zone ends (e.g., end of town or specific traffic sign), SafetyNet 200 also has to know that now that the speed limit has changed, it's okay to go above the previous speed limit, otherwise it would restrict the speed of the car and that could be dangerous 2. SafetyNet 200 may be trained to restrict the vehicle dynamics for cornering, so the car doesn't get into an unstable situation. There is a situation where an obstacle has to be avoided to prevent an accident. Braking is not enough to avoid the obstacle, so PlanningNet 102 tries to swerve around the obstacle, which could easily get over the limits SafetyNet 200 is programmed to avoid. In that case SafetyNet 200 has to also know what the situation is.

Regarding the first example, it is true that the traffic laws are there for safety and avoiding hazards. The laws will also generally be included in the PlanningNet 102. In some non-limiting contexts, SafetyNet 200 makes its decisions solely based on what it considers safe or hazardous regardless of traffic laws. Staying within laws can be handled by LegalNet (see below). It is this LegalNet and/or PlanningNet 102 that should know, based on the country, what legal or illegal actions are, for example, to allow speeding up. For example, LegalNet could make speed determinations based on detection of speed limit signs, both static and dynamic speed limits Such dynamic posted speed limits may be based on conditions such as traffic, daytime or nighttime, rain or shine, etc. Moreover, speed limits can be determined by referencing data in maps 210.

As for the second example, just like PlanningNet 102, SafetyNet 200 should know swerving around the obstacle is the way to go and actually prevent anything other than that if that's the least hazardous action. Hitting the obstacle should score high in terms of being hazardous. That means SafetyNet 200 should not only be trained but should also know more detail about the situation (also see section below on MoralNet).

The second part of the discussion should not be taken in isolation to the problem of availability. In its simplest form, SafetyNet 200 is just "a gate-keeper to keep that tentative action from becoming a real one". In this case, it is just a checker and cannot drive the car like the PlanningNet 102. This scenario is not much use as PlanningNet 102 will be gated because of a potentially hazardous situation, but it is desirable to avoid the classical duplex standoff (when there is a disagreement but the optimal course is uncertain). In the active case, it is possible to do more than detecting the hazardous situation; the system can avoid it. The training preferably includes generating an adequate response to a given situation. That is, if it is necessary to swerve to avoid an obstacle, the system can do so within the physical limits of the car; but if there is no hazardous situation, then the training should not include abrupt movements.

It may not be entirely predictable how the PlanningNet network 102 will react in certain situations. Thus, the autonomous system might react in a way that a human would never react and which a human could not easily predict or foresee. Therefore, simulations of all sorts are helpful to provide adequate training to encompass a wide variety of scenarios, some of which might not be foreseeable.

Example Good Use Case

SafetyNet 200 in example non-limiting embodiments does not know how to drive so it cannot participate in any kind of voting decisions with respect to driving. Rather, SafetyNet 200 can declare, based on its observation of the outputs of the one or more driving networks, that an output and/or decision is incorrect or dangerous. This can cause graceful degradation, taking over by a human driver, or other corrective actions to prevent unsafe conditions. SafetyNet 200 can thus provide the diagnostic for dual redundancy in a dual redundancy/diagnostic architecture. If one of the systems does something wrong, SafetyNet 200 can declare that that action is wrong. If the SafetyNet 200 does not declare the output of the other (redundant) system such as PlanningNet 102 to be wrong, then that output can be used.

In some non-limiting implementations, the diagnostic that SafetyNet 200 is applying need not be for a primary PlanningNet 102 neural network; it could be some other process, such as a human-conducted process or an autonomous machine-based process that is not conducted based on neural networks.

In other example embodiments, the primary PlanningNet 102 neural network can be sufficiently trained and verified so that it will rarely make any mistakes. However, to comply with a rigorous safety standard such as ISO 26262, mistake rates must fall within acceptable limits Therefore, SafetyNet 102 can be used to provide a checker function to avoid even rare, unpredictable and unforeseeable mistakes from being made. The standard assumes that the primary function will make rare mistakes, and focusses on that moment and what to do when that moment is detected.

Other Decision-Making Networks

Other decision-making processes may need to happen in an autonomous system. They can be kept separate from SafetyNet 200 and the output of all these processes taken in as input by a very simple and highly reliable software and hardware for determining the final action. They provide a diverse redundancy scheme as they look at the problem of autonomous driving from their perspective only. This narrowed view makes their neural network diverse.

SimpleNet

Figure 4:
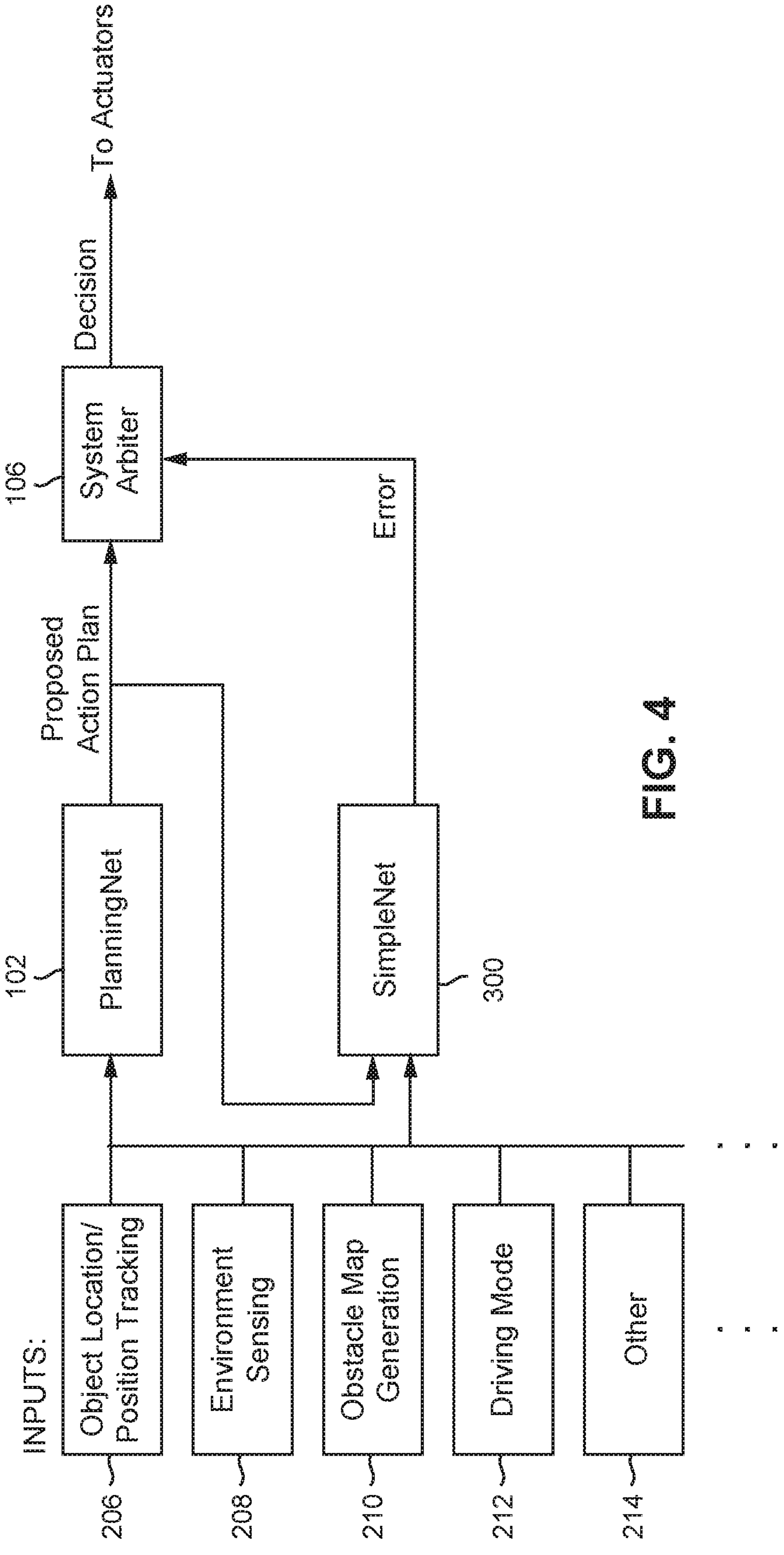
FIG. 4 shows an example non-limiting system including a SimpleNet neural network.

FIG. 4 shows a further non-limiting embodiment using a SimpleNet 300 in conjunction with PlanningNet 102. SimpleNet 300 receives the same (or in some cases a subset of) the inputs that PlanningNet 102 receives, and can be trained using the same training inputs as PlanningNet. However, SimpleNet 300 may be configured and structured to make more coarse decisions, as well as to compare its decisions with those made by PlanningNet 102.

Background and Motivation

As already discussed in earlier sections, the main functional safety concern with PlanningNet 102 is to know when the execution of the DNN has gone off the rails (out of safe bounds) due to hardware and/or software faults during inference.

DNNs are generally tolerant to isolated data errors but not control/instruction side faults. Redundancy is a solution but this is expensive, especially for large networks. The SimpleNet 300 proposal comes about from the assumption that in order to identify a major failure in the PlanningNet 102 DNN, a lower complexity, simpler network can be used in a duplex comparison scenario.

In one particular non-limiting example implementation, SimpleNet 300 can be applied up to and before the final layer of a main neural network. The final layer and post-processing steps after that (e.g., bounding box processing) can be replicated for the two while the bulk of the main neural network is replicated in a SimpleNet (lower precision) form. Other implementations are possible.

Both networks (PlanningNet 102 and SimpleNet 300) could be trained together: a "mission" network (PlanningNet 102), which has full accuracy, and a "checker" network (SimpleNet 300) which is too inaccurate for use as a mission network but is accurate enough to signal major deviations of the mission. A preferred design criterion is that only major deviations need to be caught but minor deviations of the mission network due to errors are not catastrophic.

During the training phase, both networks (PlanningNet 102 and SimpleNet 300) can be simultaneously trained which would be more efficient and the error bound for SimpleNet set to some pre-defined limit This would also bring value to a training implementation.

A practical realization of the system on SoCs or GPUs could implement the PlanningNet 102 mission network on the deep learning accelerator (DLA) with SimpleNet 300 on the graphics processing unit (GPU) or vice versa. This would also bring diversity to the hardware implementation, to help detect hardware systematic faults. In a future architecture implementation, either the DLA or the GPU could be optimized for this type of SimpleNet 300 checker network.

Input and Output

In some non-limiting implementations as shown in FIG. 4, SimpleNet 300 has the same inputs as PlanningNet 102 and these are combined with the reference outputs of PlanningNet. SimpleNet 300 indicates an error when the maximum authorized deviation is surpassed. An arbiter 106 can take appropriate action based on the error, such as switch to a backup system 100'.

Training

Training can be straightforward, as SimpleNet 300 uses the same training data as PlanningNet 102 but with a different error bound. SimpleNet 300 is a comparative network comparing the output of PlanningNet 102 with its own computed output derived from the same input data as PlanningNet. The training of both networks can be combined in a single training phase or run sequentially once PlanningNet 102 is trained.

CheckNet

Figure 5:
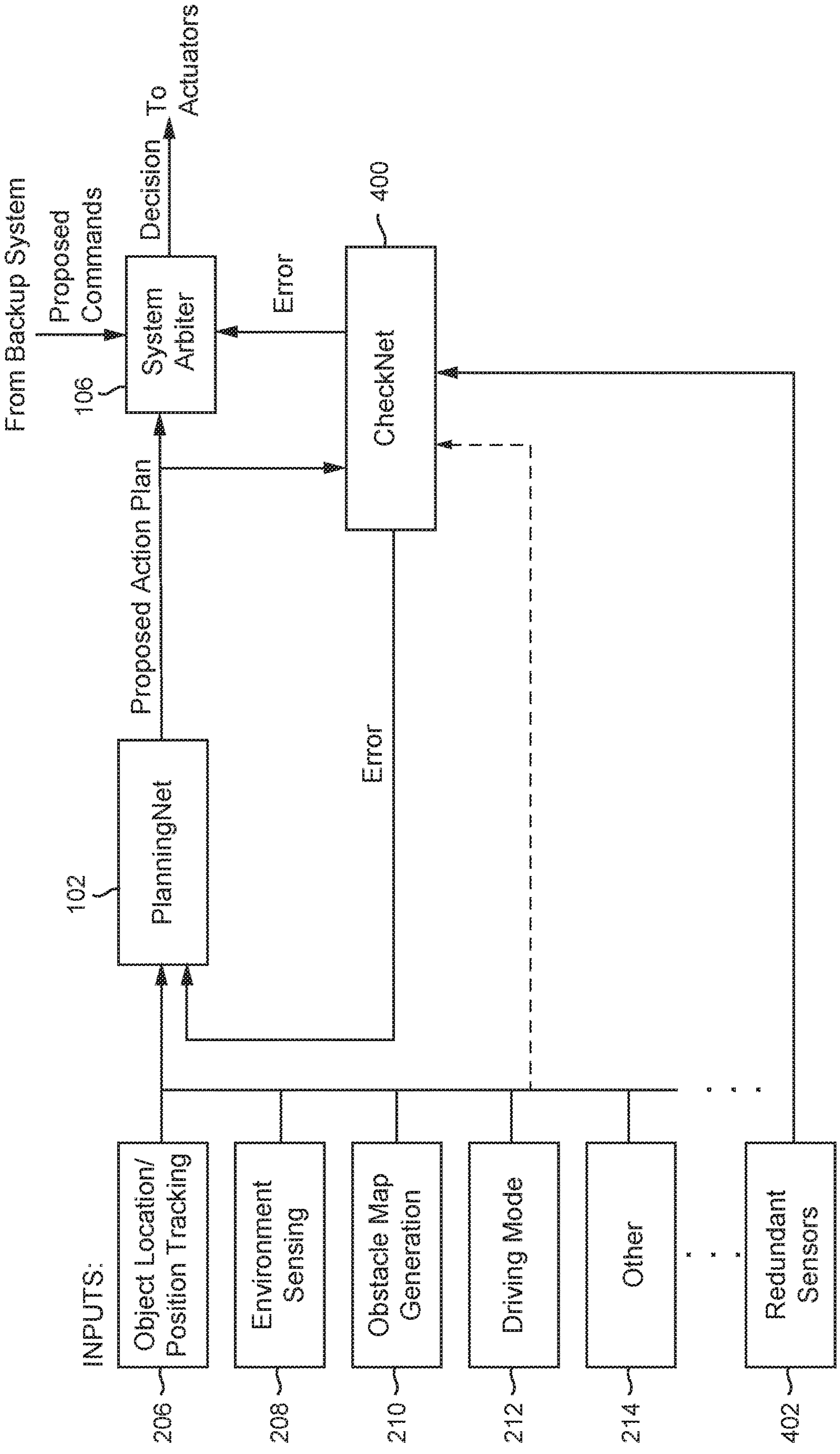
FIG. 5 shows an example non-limiting system including a CheckNet neural network.

FIG. 5 shows another example non-limiting implementation that uses a CheckNet neural network 400 in addition to the PlanningNet 102 mission neural network.

Background and Motivation

CheckNet 400 provides a verification of PlanningNet 102 based on the plausibility of PlanningNet's outputs. As a simple example, consider that PlanningNet 102 is computing the free space available for the vehicle based on multiple sensor inputs. CheckNet 400 then verifies that the area indicated as free-space is indeed free of all objects. In a simple case, this could be done by checking if any of the RADAR object detection coordinates are in the detected free space. More complex scenarios could be envisaged using multiple sensor inputs 402 for CheckNet 400 (e.g., LIDAR, RADAR, Cameras).

The main benefits of this approach over the simple duplicated network scenario are that the two implementations are diverse which is helpful for the detection of systematic problems. In non-limiting embodiments, the error detection method is not based on comparison. CheckNet 400 is independently checking the output of PlanningNet 102 and will indicate an error independently. This does not resolve the duplex stand-off problem in that the system does not know if the error is in PlanningNet 102 or CheckNet 400.

The tasks "find free space" and "detect objects within free space" are significantly different in nature and complexity which would result in two substantially different networks of diverse implementation and complexity.

Input and Output

CheckNet 400 uses the output or decision of PlanningNet 102 and either the same inputs as PlanningNet or redundant sensor inputs 402 as useful under the system safety concept. Plausibility is checked based on these and an error is signaled if an implausible solution is found. In one example embodiment, the system can switch in a backup PlanningNet 102 if the plausibility check CheckNet 400 performs reveals errors.

Training

Unlike the previous example of SimpleNet 300, in one example non-limiting implementation there is no relationship between training of PlanningNet 102 and training of CheckNet 400. Taking the example of free space detection used earlier, training data would be straightforward to produce synthetically. ISO 26262 Standard Perspective "Road vehicles—Functional safety", ISO 26262 (2011), is an international standard for functional safety of electrical and/or electronic systems in production automobiles defined by the International Organization for Standardization (ISO). From an ISO 26262 safety perspective, PlanningNet 102 is trained to "drive the car". For example, it may be trained by crowd-sourcing or on the road learning by observing human drivers driving in instructive driving situations.

If PlanningNet 102 software were perfect and could drive the car, the system could run CheckNet 400 in parallel to check for hardware systematic/random faults causing bad behavior. However, most practical implementations of PlanningNet 102 will not be absolutely perfect. For example, PlanningNet 102 may be limited by its own training, e.g., by not encountering enough corner cases to avoid all possible hazards. The PlanningNet 102 functionality can be augmented with classical obstacle avoidance and checks 202 during training. As discussed above, the goal of SafetyNet 200 is to "avoid accidents", that is, it cannot drive the car but can avoid hazardous situations.

The FIG. 5 approach decomposes the safety goals which are "do not cause an accident"="drive the car"+"avoid accidents" which can be used to decompose the Automotive Safety Integrity Level (ASIL) D goal from ISO 26262 "do not cause an accident" (e.g., do not cause an event having reasonable possibility of causing a life-threatening (survival uncertain) or fatal injury, with the injury being physically possible in most operating conditions, and with little chance the driver can do something to prevent the injury) to something manageable.

LegalNet

There are many different traffic laws throughout the country and the world. Some of these traffic laws are complex. For example, in California, unless otherwise posted, the maximum speed limit is 55 mph on two-lane undivided highways and for vehicles towing trailers. The posted speed on most California highways is 65 mph, and it is permissible to drive 70 mph where posted. On the other hand, California law forbids a vehicle from driving faster than is safe for current conditions. Moreover, some localities within California have their own, additional standards and ordinances. Meanwhile, a California driver can be cited for blocking the normal and reasonable movement of traffic by driving too slowly. Other states may have completely different laws and standards.

Figure 6:
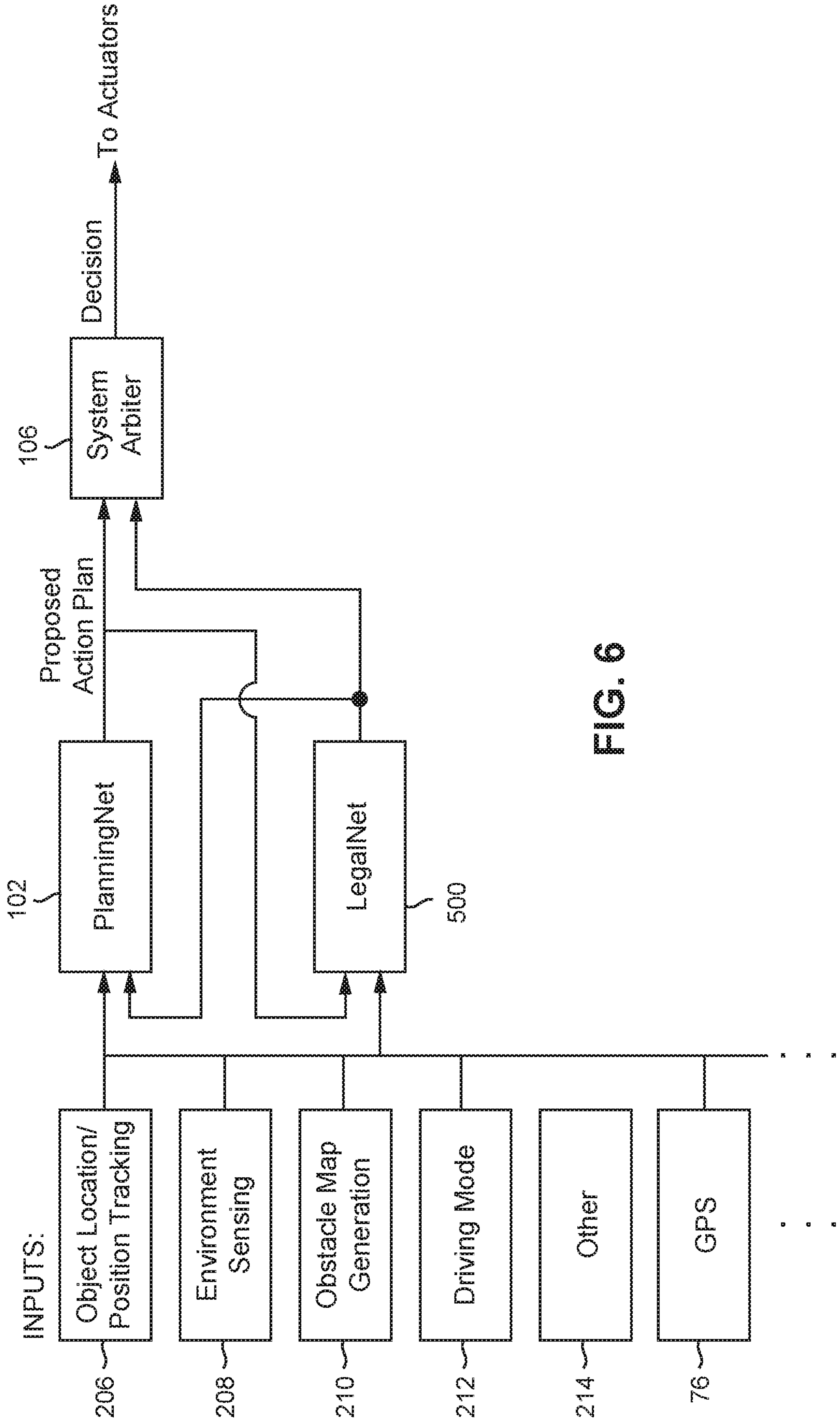
FIG. 6 shows an example non-limiting system including a LegalNet neural network.

Legal and illegal actions can be integrated into PlanningNet 102 but as FIG. 6 shows, some non-limiting embodiments have a separate deep learning network called LegalNet 500 that indicates whether a particular action or course of action (tentative sequence of actions) is legal according to the local (country/city, etc.) laws. LegalNet 500 can augment the PlanningNet 102 and provide diversity for dealing with PlanningNet software systematic faults. Sticking to the strict traffic rules is probably easier (and more verifiable) to be done algorithmically, i.e., hand-coded using a hand-coded safety system 202 as shown in FIG. 2. It is the conventional driving 'norms' that break the strict rules in a 'legal' way (like going with the traffic flow at 70 mph in a 65 mph zone) that is likely to be a good fit for machine learning, especially by being trained for each geographic location.

LegalNet 500 could for example be trained based on a data set that includes police officer determinations, administrative decisions and judicial rulings concerning traffic behavior. For example, LegalNet 500 could be trained to provide guidance, based on past legal precedent and/or expert input, on what local courts and law enforcement would expect under the local law from drivers in certain environmental conditions such as rain, snow, ice, fog, darkness, etc. LegalNet 500 could also provide guidance on the practical application of legal standards under conditions in which most vehicles are exceeding the posted speed limit There may for example be a tradeoff between strict observance of the law and safety, where a vehicle driving at the posted speed limit could pose a hazard that outweighs the risk that law enforcement might strictly enforce the speed limit. LegalNet 500 could be further trained concerning legal penalties imposed by different localities for violating speed limits or other traffic laws. For example, LegalNet 500 could provide guidance that exceeding the posted speed limit by 8 miles per hour is rarely if ever ticketed in Los Angeles County, is sometimes enforced in Orange County and is often enforced in Kern County. LegalNet 500 may accept as input GPS location as well as environmental conditions (e.g., visibility, temperature, precipitation) to enable it to provide guidance from a legal perspective.

LegalNet 500 could also be configured to accept inputs from a human operator of the vehicle. For example, the selected driving mode 212 (comfort/normal/spirited/sport) is an interesting input to the LegalNet network 500. For example, a "comfort" setting for the driving mode 212 input might condition LegalNet 500 to stay at or below the speed limit, whereas "sport" might condition LegalNet to keep up with the flow of traffic. Other inputs might include biometric sensors to detect blood alcohol level or other intoxicants.

Figure 6A:
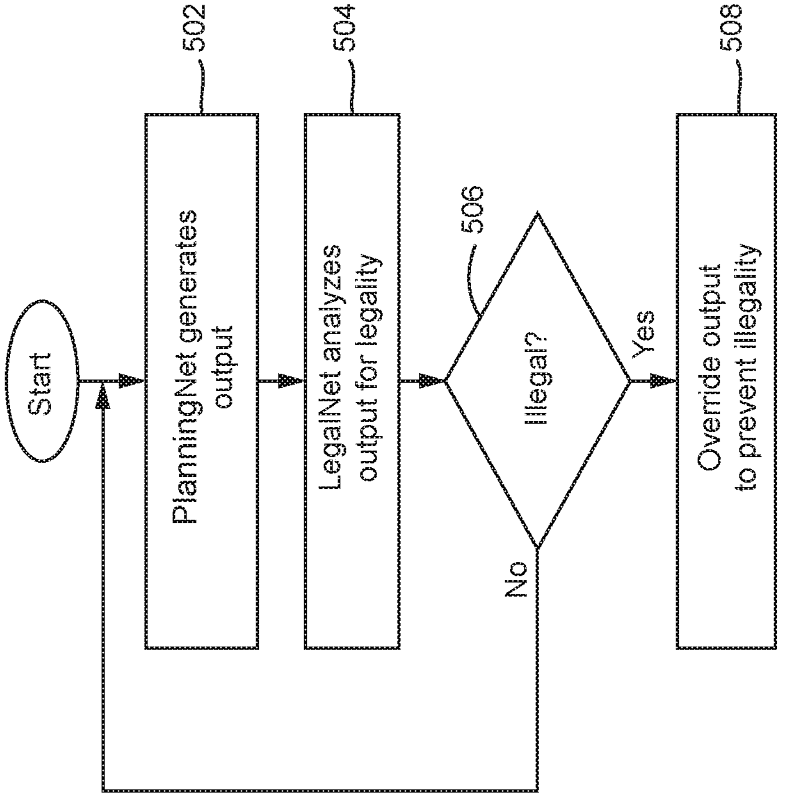
FIG. 6A is a flowchart of an example non-limiting LegalNet operation.

LegalNet 500 can receive outputs from PlanningNet 102 (FIG. 6A block 502) and analyze those outputs to determine whether PlanningNet is about to command the actuators in a way that will violate legal standards (FIG. 6A block 504). In some example non-limiting embodiments, LegalNet 500 could provide an output as an input to PlanningNet 102, and PlanningNet could be conditioned to modify its decision making based on the LegalNet inputs. In other non-limiting embodiments, LegalNet 500 could provide outputs to a system arbiter 106 that could switch to a backup system 100' or in some cases use the LegalNet outputs to substitute or modify the control outputs provided by PlanningNet 102 (e.g., override PlanningNet's throttle control with lower, more legally permissible values) (FIG. 6A blocks 506, 508). LegalNet 500 could operate in conjunction with other xNets such as SafetyNet 200, SimpleNet 300, CheckNet 400, etc.)

In summary, in some example non-limiting embodiments, LegalNet 500 is concerned not so much with safety as with compliance with rules and laws. LegalNet 500 can be trained to recognize that strict compliance with laws can occasionally be dangerous (e.g., if the traffic on a given highway is all slightly exceeding the posted speed limits, it may be less safe to drive at the posted speed limits rather than to go with the flow). The decision of whether to be more flexible could be left to the human driver, who can switch between modes at will. The driver could, for example, instruct LegalNet 500 that it is OK to be flexible concerning speed limits so long as it keeps within the limit of not getting caught or not being charged with or committing reckless driving. Such mode control could be associated with the level of autonomous driving aggressiveness (e.g., normal mode, sports mode, etc.).

MoralNet

In certain situations, any course of action may lead to hazardous outcomes of various forms or degrees. SafetyNet 200 could output a 'hazard level' for each course of action, but that may not be adequate for making a decision. Picking the 'moral' course of action could become a very tough philosophical problem. This can be left to a separate deep learning network that we can call MoralNet 600.

Figure 7:
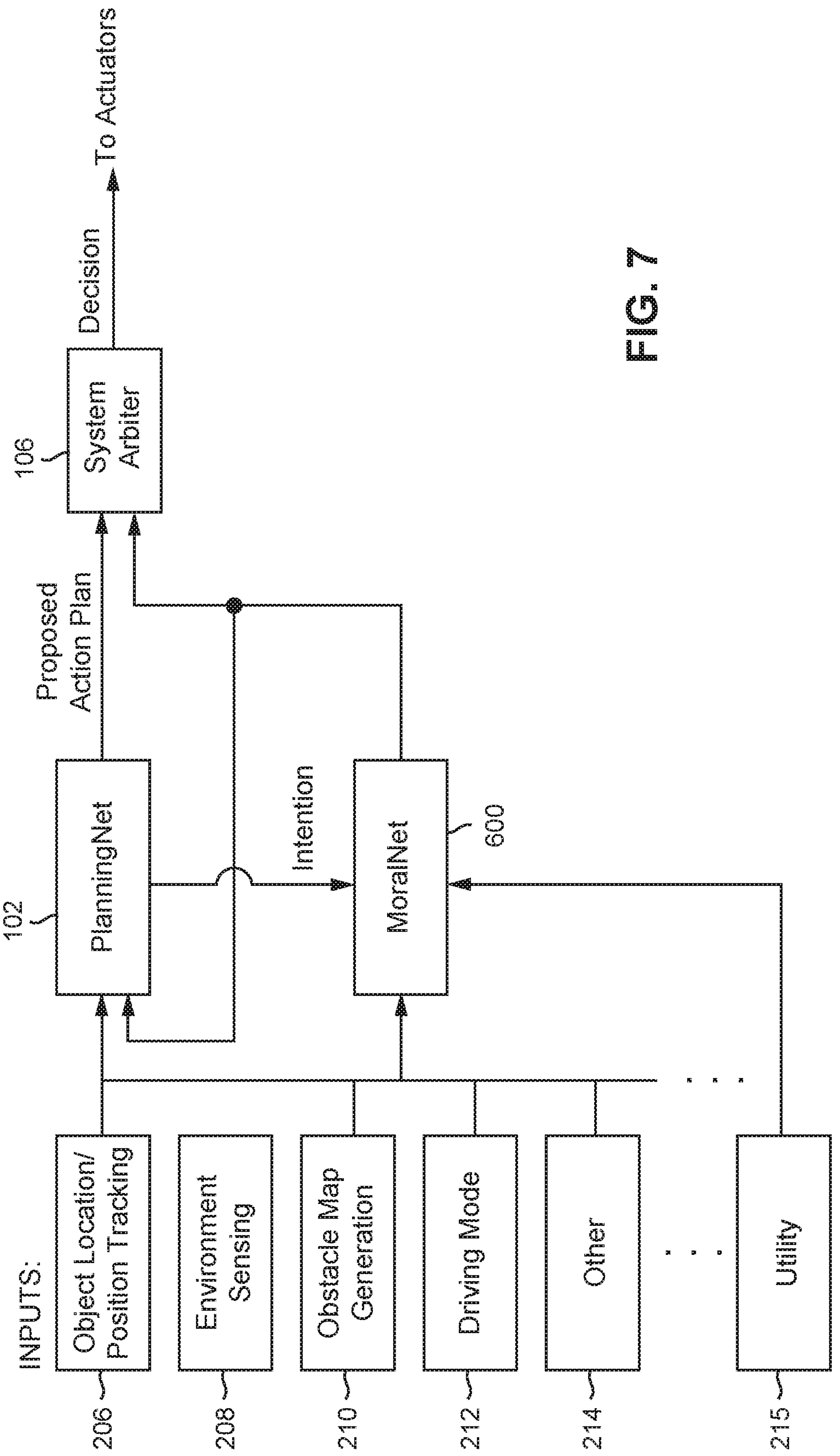
FIG. 7 shows an example non-limiting system including a MoralNet neural network.
Figure 7A:
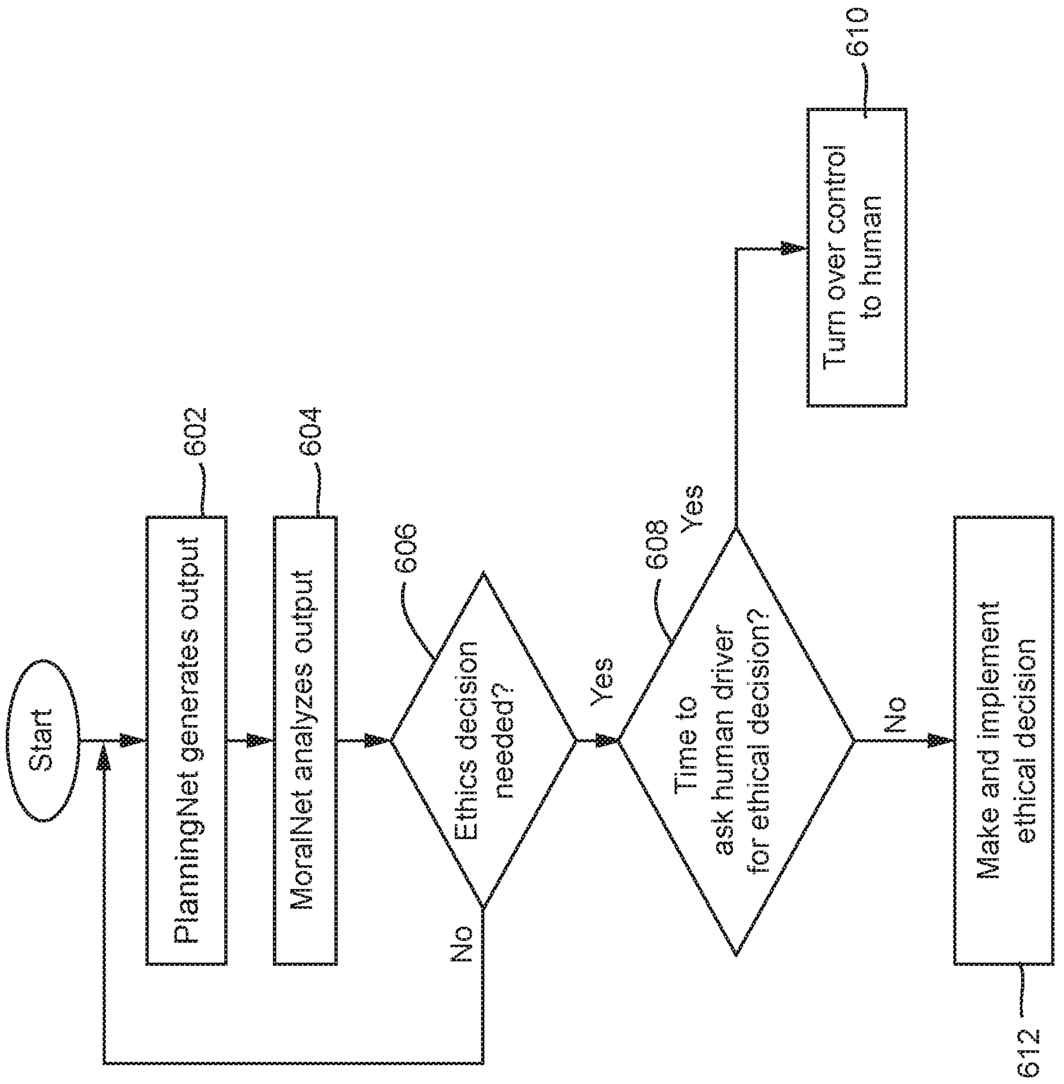
FIG. 7A is a flowchart of example non-limiting MoralNet operation.

In one example non-limiting embodiment, MoralNet 600 may be trained on a data set comprising driving dilemmas and resolutions based on ethics as articulated, for example, by Aristotle, Immanuel Kant, John Stuart Mill and John Rawls. For example, MoralNet 600 may be trained for scenarios in which a child dashes into the road and the driver must choose between hitting the child, an oncoming vehicle in the other lane, or a telephone pole. Such decision making could change based on the prevailing ethical standards in the locality in which the car is being driven and/or the ethics of the individual human driver. Generally, it may be most desirable to turn ethical decision making and associated control over to a human driver, but sometimes there will not be enough time for the human driver to react. An alert and manual override control could be provided to enable a human to take over anytime an ethical decision is required (FIG. 7A blocks 602-612).

While the example non-limiting embodiments have been described in connection with autonomous vehicles, the technology herein is more generally applicable to any application in which a neural network can be used to check or otherwise monitor any process, autonomous or otherwise. As one example, the technology herein could be used in the context of medical, surgical or any other types of robots to detect when the robot is about to do something that may potentially hurt the patient or other human, animal or property. Such technology can ensure a robot behaves legally, morally and/or safely. In still other embodiments, one or more xNets as discussed above are used to complement or act antagonistically or in opposition to a process that is at least in part performed by one or more humans.

Each and every document cited above is hereby expressly incorporated by reference herein as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A diverse redundancy autonomous vehicle control system comprising:

- sensor inputs for operative connection to sensors that detect obstacles;
- a memory; and
- at least one processor operatively coupled to the sensor inputs and the memory, the at least one processor executing, based on instructions stored in the memory, a first neural network configured to determine safe driving behavior and to provide responses to the sensor inputs to generate autonomous vehicle action planning to avoid the detected obstacles;
- the at least one processor executing in parallel with the first neural network, based on instructions stored in the memory, a second neural network configured to determine unsafe driving behavior and providing at least some responses to the sensor inputs that do not overlap the responses of the first neural network, the second neural network checking the vehicle action planning the first neural network generates and producing oppositional outputs that enable selective overriding and/or modifying of the action planning the first neural network generates.

2. The system of claim 1 wherein the at least one processor executes instructions stored in the memory to control the second neural network to check the generated action planning for at least one condition from the group of conditions comprising:

- whether the generated action planning will cause unsafe operation if implemented;
- whether the generated action planning will cause an illegal operation if implemented; or
- whether the generated action planning will cause an unethical operation if implemented.

3. The system of claim 2, wherein the a different neural network is used to concurrently check the generated action planning for each condition of the group of conditions.

4. The system of claim 2, wherein the second neural network is used to check the generated action planning for two or more conditions of the group of conditions.

5. The system of claim 1 wherein the first neural network generates plural potential plans of action, and executes instructions stored in memory to control the second neural network to rate the plural potential plans of action.

6. The system of claim 5 wherein the at least one processor executes instructions stored in memory to control the second neural network to rate based on safety the action planning the first neural network generates.

7. The system of claim 1 wherein the first and second neural networks are trained using the same data.

8. The system of claim 1 wherein the first and second neural networks are trained using different data.

9. The system of claim 1 further comprising an arbiter that decides whether to override the action planning the first neural network generates in response to the outputs the second neural network produces.

10. The system of claim 1 wherein the sensor inputs comprise at least two of object location/position tracking, environment sensing, and obstacle location mapping.

11. The system of claim 1 wherein the at least one processor executes instructions in memory to control the second neural network to generate a hazard level scalar value indicating a hazard level of the generated action planning.

12. The system of claim 1 further including a hand-coded safety system that also concurrently monitors the action planning.

13. The system of claim 1 wherein the second neural network is configured to be simpler and/or lower resolution than the first neural network.

14. The system of claim 1 wherein the first neural network generates an intention signal, and the second neural network uses the intention signal to evaluate the autonomous vehicle action planning.

15. A method performed by a least one processor by executing instructions stored in memory, the method comprising:

executing first instructions stored in memory to process sensor inputs with a first neural network configured to determine safe driving behavior and to generate operational outputs based on first responses to the sensor inputs;

executing second instructions stored in memory to concurrently process the same or different sensor inputs with a second neural network different from the first neural network, the second neural network being complementary to the first neural network used to generate the operational outputs, the second neural network configured to determine unsafe driving behavior and providing at least some responses to the sensor inputs that are oppositional to the responses of the first neural network; and selectively implementing the generated operational outputs at least in part in response to the processing with the oppositional responses of the second, complementary neural network.

16. The method of claim 15 further including training the first and second neural networks with the same training data.

17. The method of claim 15 further including training the first and second neural networks with different training data.

18. The method of claim 15 wherein selectively implementing includes arbitrating use of the generated operational outputs at least in part in response to oppositional responses of the second, complementary neural network.

19. A system comprising:

at least one neural network configured to determine how to drive safely that generates operation commands in response to inputs; and at least one further machine learning object configured to determine how not to drive safely that produces at least some oppositional responses to the at least one neural network, the at least one further machine learning object providing:

1) a lower accuracy or precision than the at least one neural network, and/or 2) an oppositional response that is the inverse of the operation commands the at least one neural network produces; and/or 3) checking to determine whether the operation commands are reasonable based on an intention signal the at least one neural network provides.

20. The system of claim 19 wherein the at least one further machine learning object comprises a second neural network.

* * * * *